US006886003B2

(12) United States Patent
Kishi

(10) Patent No.: US 6,886,003 B2
(45) Date of Patent: Apr. 26, 2005

(54) METHOD FOR CONTROLLING MACHINE WITH CONTROL MODULE OPTIMIZED BY IMPROVED EVOLUTIONARY COMPUTING

(75) Inventor: Tomoaki Kishi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 545 days.

(21) Appl. No.: 09/873,510

(22) Filed: Jun. 4, 2001

(65) Prior Publication Data

US 2002/0013776 A1 Jan. 31, 2002

(30) Foreign Application Priority Data

Jun. 28, 2000 (JP) .................................. 2000-195194

(51) Int. Cl.[7] .............................................. G06F 15/18
(52) U.S. Cl. ............................. 706/25; 706/13; 706/14
(58) Field of Search ................................ 706/25, 12–14

(56) References Cited

U.S. PATENT DOCUMENTS

| | | | | |
|---|---|---|---|---|
| 4,935,877 A | * | 6/1990 | Koza ........................ | 706/13 |
| 5,136,686 A | * | 8/1992 | Koza ........................ | 706/13 |
| 5,148,513 A | * | 9/1992 | Koza et al. ................ | 706/13 |
| 5,343,554 A | * | 8/1994 | Koza et al. ................ | 706/13 |
| 5,390,283 A | * | 2/1995 | Eshelman et al. .......... | 706/13 |
| 5,864,833 A | * | 1/1999 | Schaffer et al. ............ | 706/13 |
| 5,909,674 A | * | 6/1999 | Schaffer et al. ............ | 706/13 |
| 6,021,369 A | * | 2/2000 | Kamihira et al. .......... | 701/102 |
| 6,032,139 A | * | 2/2000 | Yamaguchi et al. ........ | 706/13 |
| 6,064,996 A | * | 5/2000 | Yamaguchi et al. ........ | 706/13 |
| 6,275,815 B1 | * | 8/2001 | Schaffer et al. ............ | 706/13 |
| 6,282,528 B1 | * | 8/2001 | Schaffer et al. ............ | 706/13 |
| 6,564,194 B1 | * | 5/2003 | Koza et al. ................ | 706/13 |

OTHER PUBLICATIONS

Anthony Tzes, Pei–Yaun Peng, and John Guthy, Genetic–Based Fuzzy Clustering for DC–Motor Friction Identification and Compensation, IEEE Transactions on Control Systems Technology, vol. 6, No., 4, Jul. 1998.*
A fuzzy matter–element scheme multi–objective optimization method based on genetic algorithm Zhao Yanwei; Zhang Guoxian; Intelligent Control and Automation, 2002. Proceedings of the 4th World Congress on , vol. 3 , 2002 pp.: 1844–1848.*
Genetic–based fuzzy clustering for DC–motor friction identification and compensation Tzes, A.; Pei–Yuan Peng; Guthy, J.; Control Systems Technology, IEEE Transactions on , vol.: 6 , Issue: 4 , Jul. 1998 pp.: 462–472.*
Optimising train movements through coast control using genetic algorithms Chang, C.S.; Sim, S.S.; Electric Power Applications, IEE Proceedings–, vol.: 144 , Issue: 1 , Jan. 1997 pp.: 65–73.*
Neurite Networks: the genetic programming of cellular automata based neural nets which GROW de Garis, H.; Neural Networks, 1993. IJCNN '93–Nagoya. Proceedings of 1993 International Joint Conference on , vol.: 3 , Oct. 25–29, 1993 pp.: 2921–2924 vol. 3.*

(Continued)

*Primary Examiner*—Anthony Knight
*Assistant Examiner*—Michael B. Holmes
(74) *Attorney, Agent, or Firm*—Knobbe, Martens, Olson & Bear LLP

(57) ABSTRACT

Efficiency of evolution in optimization method is improved using evolutionary computing to obtain individuals of higher suitability by repeating the steps of: forming one generation with a group of individuals, and performing calculation using individuals of at least said generation to create a group of individuals of the next generation. The method is characterized in that a search area for next generation individuals is provided in a selection space and a group of next generation individuals is created within the search area.

22 Claims, 24 Drawing Sheets

OTHER PUBLICATIONS

Genetic algorithm solution for the intelligent turret assembly system Chung Meng Hee; Lee Keok Kee; Tay Leng Phuan; Tan Hock Woo; Control, Automation, Robotics and Vision, ICARCV . 7th International Conference on , vol. 1 , 2002 pp.: 354–359.*

Encoding feedforward networks for topology optimization by simulated evolution Schiffmann, W.;Knowledge–Based Intelligent Engineering Systems and Allied Technologies, 2000. Proceedings. Fourth International Conference on , vol. 1 , pp.: 361–364.*

A genetic algorithm for the single machine total weighted tardiness problem Liu, N.; Abdelrahman, M.A.; Ramaswamy, S.; System Theory, Proceedings of the 35th Southeastern Symposium on , 2003 pp.: 34–38.*

A genetic algorithm with a machine order–based representation scheme for a class of job shop scheduling problem Song, Y.; Hughes, J.G.; American Control Conference, 1999. Proceedings of the 1999 , vol.: 2 , Jun. 2–4, 1999 pp.: 895–899 vol. 2.*

A classifier with the fuzzy Hopfield network for human chromosomes Xiaogang Ruan; Intelligent Control and Automation, 2000. Proceedings of the 3rd World Congress on , vol.: 2 , Jun. 28–Jul. 2, 2000 pp.: 1159–1164 vol. 2.*

Petri–net and GA–based approach to modeling, scheduling, and performance evaluation for wafer fabrication Jyh–Horn Chen; □□Li–Chen Fu; Ming–Hung Lin; An–Chih Huang;Robotics and Automation, IEEE Transactions on , vol.: 17 , Issue: 5 , 2001 pp:619–636.*

Genetic reinforcement learning approach to the heterogeneous machine scheduling problem Gyoung Hwan Kim; Lee, C.S.G.;□□Robotics and Automation, IEEE Transactions on , vol.: 14 , Issue: 6 , Dec. 1998 pp.: 879–893.*

* cited by examiner

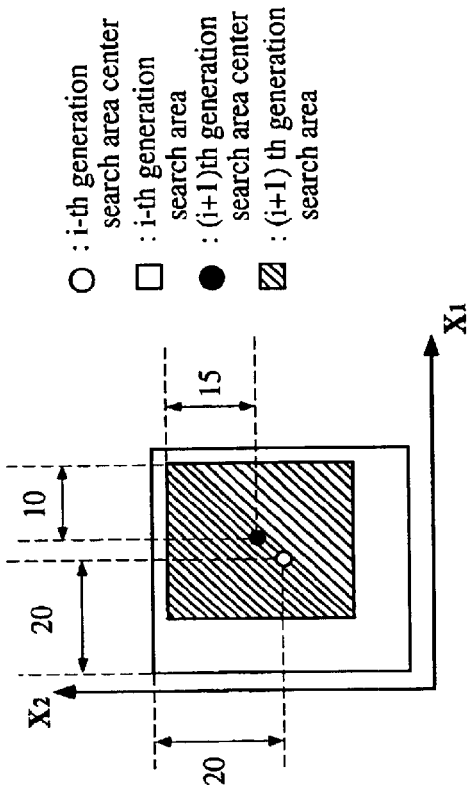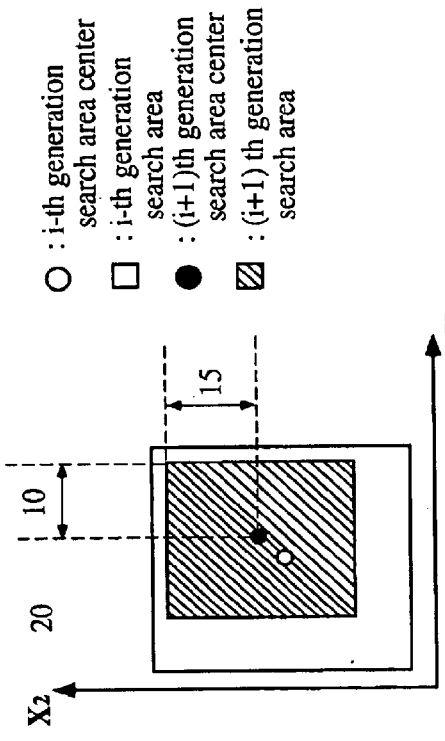

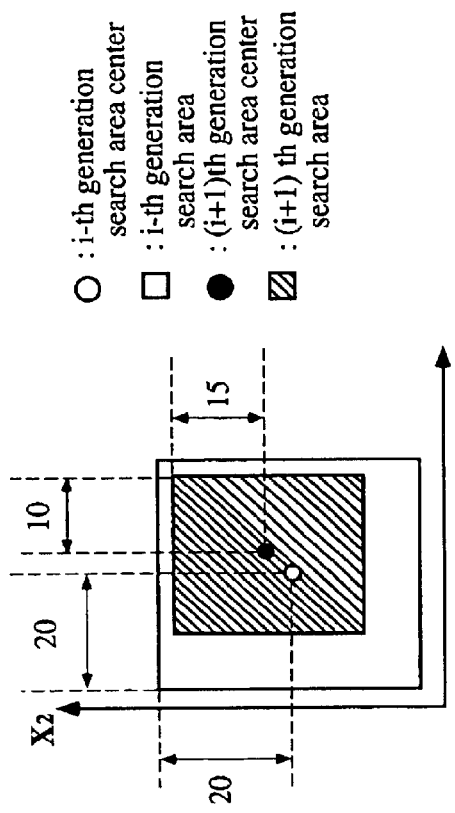

*Figure 5A(a)*

① Change based on current size

| Shift distance (d) of search area center position | Search area size (Amount of change in center-to-edge distance) | |
|---|---|---|
| | X1 direction | X2 direction |
| 60 ≤ d | +20 | +10 |
| 40 ≤ d < 60 | +10 | +5 |
| 20 ≤ d < 40 | 0 | 0 |
| 0 ≤ d < 20 | -10 | -5 |

*Figure 5A(b)*

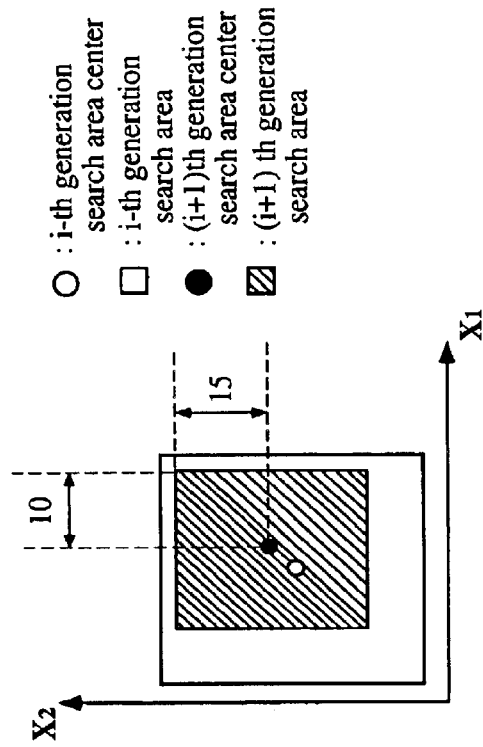

*Figure 5B(a)*

② Change irrespective of current size

| Shift distance (d) of search area center position | Search area size (Amount of change in center-to-edge distance) | |
|---|---|---|
| | X1 direction | X2 direction |
| 60 ≤ d | 25 | 30 |
| 40 ≤ d < 60 | 20 | 25 |
| 20 ≤ d < 40 | 15 | 20 |
| 0 ≤ d < 20 | 10 | 15 |

*Figure 5B(b)*

○ : i-th generation search area center
□ : i-th generation search area
● : (i+1)th generation search area center
▨ : (i+1)th generation search area

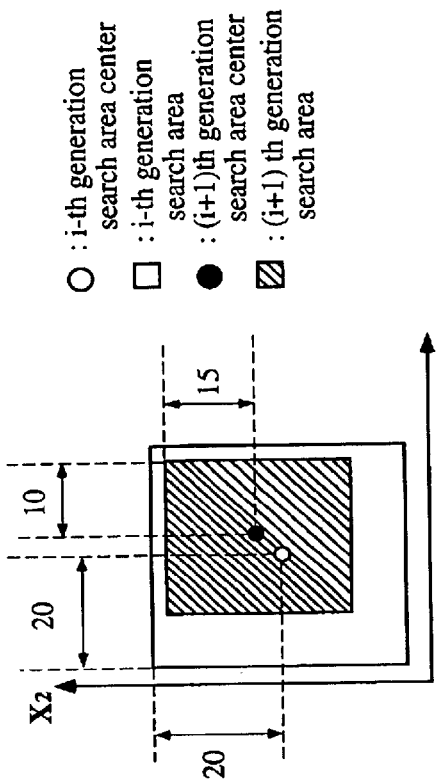
① Change based on current size
*Figure 6A(a)*
*Figure 6A(b)*
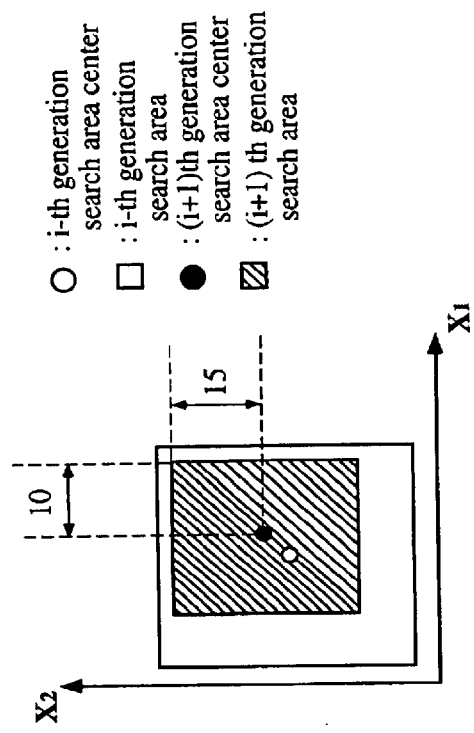
② Change irrespective of current size
*Figure 6B(a)*
*Figure 6B(b)*

Figure 15(a) Rapid acceleration with small opening

Figure 15(b) Rapid acceleration with wide opening

Figure 15(c) Linear

| SP$_1$ | SP$_2$ | DR | AG |

*Figure 17*

①: Change by best evaluation value (Determine irrespective of current search area size)

*Figure 21(a)*

| Best evaluation value Y | Size of next generation search area (Center-to-edge distance) | | | |
|---|---|---|---|---|
| | SP1 | SP2 | DR | AG |
| 0 ≤ Y < 50 | 25 | 25 | 30 | 30 |
| 50 ≤ Y < 70 | 20 | 20 | 25 | 25 |
| 70 ≤ Y < 90 | 15 | 15 | 20 | 20 |
| 90 ≤ Y ≤ 100 | 10 | 10 | 15 | 15 |

②: Change by best evaluation value (Change based on current search area size)

*Figure 21(b)*

| Best evaluation value Y | Search area size (Amount of change in center-to-edge distance) | | | |
|---|---|---|---|---|
| | SP1 | SP2 | DR | AG |
| 0 ≤ Y < 50 | +5 | +5 | +5 | +5 |
| 50 ≤ Y < 70 | 0 | 0 | 0 | 0 |
| 70 ≤ Y < 100 | -5 | -5 | -5 | -5 |

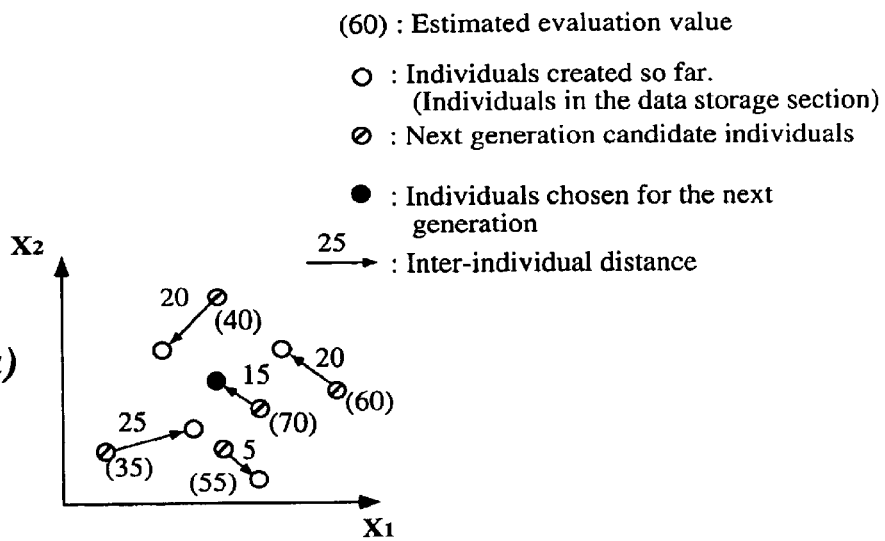
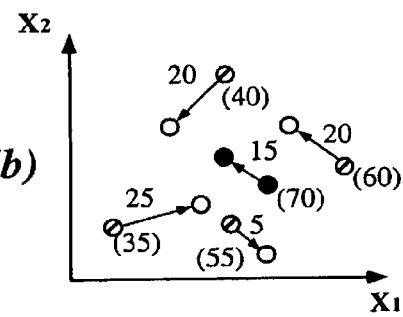
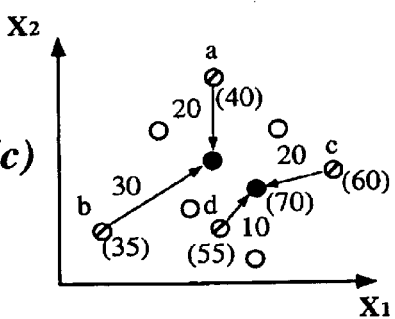
*Figure 24(a)*
*Figure 24(b)*
*Figure 24(c)*

METHOD FOR CONTROLLING MACHINE WITH CONTROL MODULE OPTIMIZED BY IMPROVED EVOLUTIONARY COMPUTING

BACKGROUND OF THE INVENTION

1. Field of the Invention

This invention relates to a method and apparatus for optimizing performance of a machine such as a motor, and particularly to an improved method and apparatus for optimizing a control module that controls performance of the machine.

2. Description of Related Art

In the past, optimal values of a characteristic of a control module (namely, parameter values for deciding input-output relationship of the control module) to control a controlled system were determined by experiment at the time of designing or adjusting settings before shipment, assuming a users of a product comprising the controlled system so that the users' characteristics (preference, technique, personality, and use) could be met.

However, with the diversity and advancement of recent technology, the conventional method of deciding optimal values of a characteristic of the control module by experiment becomes difficulty to optimize the control module, and requires a lot of time.

Since personal characteristics or preferences vary from one person to another, the conventional control method cannot provide a characteristic of products which satisfy all users.

In view of the problems described above, there is proposed a para-evolutionary method. In this method, a control apparatus produces a plurality of chromosomes (individuals) by using control parameters of the control apparatus that exert influence on characteristics of a controlled subject or machine and then have some of the chromosomes evolve by a genetic algorithm by selecting excellent chromosomes based upon intention of the user.

In the method that has been proposed, the machine is actually operated with the respective chromosomes that are produced initially and the user evaluates the respective operations to select out undesirable chromosomes (individuals). Characteristics that fit to the user can be obtained in this method. In the above evolutionary computing, individuals of one generation are created, the individuals of the generation are screened to select and leave parent individuals, a group of individuals of the next generation is created by performing crossover or mutation using the parent individuals, and individuals of higher suitability are obtained by repeating the above operation. See U.S. pat. Nos. 6,032,139 and 6,021,369, for example.

SUMMARY OF THE INVENTION

In evolutionary computing, chromosomes are defined by genes which are derived from the genes of parent chromosomes under predetermined rules. Genes can be represented by numerical values which can be defined using coordinates in a selection space ("gene pool") having a predetermined size. In this way, only genes included in the selection space can be selected, and the diversity of genes can be restricted so as to maintain their species such as engine control parameters. In other words, the selection space is defined by the species.

However, in evolutionary computing, individuals are created using genes of their parents, and adapted (fitted) individuals of offspring are selected to obtain relatively better individuals among the offspring at each generation. This relative evaluation leads to a problem in that although relatively better genes are passed onto subsequent generations, finally selected relatively better individuals may not provide an optimum solution in view of absolute standards. That is, although genes of offspring are selected randomly in the selection space, the selection points or positions are concentrated in a small region of the selection space. That the individuals are created densely in a small region means that many of the individuals are similar to each other. This is a significant problem in evolutionary computing because the individuals lack versatility and evolution does not make progress. This problem may be alleviated to a certain degree by creating mutants. However, mutants are created in random positions in the selection space, and in some cases, individuals are created more different from each other than necessary in the selection space. If the differences among the individuals (distances in the coordinates in the selection space) tend to be greater than necessary as described above, a problem arises that individuals in the vicinity of optimum solution cannot be obtained and the evolution does not converge. The above problems arise due to the relative evaluation of offspring, the limited diversity of genes carried over from parents, or the randomness of genes of mutants.

In view of the foregoing, an object of the present invention is to provide an evolution efficiency improving method for use in evolutionary computing for creating the subsequent generation of individuals by making it possible to restrict the positions of individuals in the selection space to some extent for efficient proceeding of evolution.

In the present invention, a method controls performance of a machine controlled by at least one control module having an input-output relationship regulated by control parameters. In an embodiment, the method comprises the steps of: (a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space; (b) selecting and scoring adapted chromosome(s) by evaluating each chromosome based on signals indicative of performance of the machine; (c) setting a search area in the selection space in accordance with the score(s) under predetermined rules; (d) selecting genes for a subsequent generation of chromosomes within the search area, and operating the machine using the subsequent generation of chromosomes; and (e) repeating steps (b) through (d) while operating the machine until desired performance of the machine is demonstrated.

According to the above, the search area is set and changed depending on the score(s) of the adapted chromosome(s). Thus, in an embodiment, when relatively better chromosomes are selected among chromosomes of one generation, not only the chromosomes are selected based on relative evaluation, but also the search area (i.e., available gene pool) changes in accordance with the scores (i.e., absolute evaluation). Accordingly, by a combination of relative evaluation and absolute evaluation, the search area can be configured appropriately. For example, if selected chromosomes are well adapted among others but are not good in view of absolute standards, the search area is expanded in a certain direction. This approach is very different from simply creating mutants, because mutants are created in entirely random coordinates and thus a chance to obtain good chromosomes is low, and if mutants are created frequently, evolution may not converge. The search area approach lowers the randomness but maintains the diversity of chromosomes. Hereinafter, the term "individuals" may be used as a synonym for "chromosomes". Also, the term "positions" may be used as a synonym for "coordinates".

In the above, the coordinates and/or the size of the search area in the selection space can be changed in accordance with the score(s) of the adapted chromosome(s). Further, the selection of genes can be conducted randomly in the search area, or can be conducted in the search area based on the coordinates of the genes of the adapted chromosome(s).

There are several ways to determine the position and the size of a search area, which will be explained later.

In an embodiment, the aforesaid indicative signals are sensory signals, and a user who operates the machine scores the chromosomes based on the sensory signals. By doing this, the selection mechanism can technologically be simplified, and the performance of the machine can be changed adaptive to the user. In another embodiment, the indicative signals are electronic signals, and a device which receives the signals scores the chromosomes by comparing values of the signals with preselected target values. This autonomous approach reduces a users task and eases the user's operation.

In the present invention, a machine to be controlled includes any machine which can be controlled electronically using a control module. The input-output relationship of the control module is regulated by control parameters. Conventionally used control parameters can be used. The number of control parameters is not limited. Preferably, at least two parameters are used for sophisticated control. The control module can be provided with the machine or separately from the machine. The control module and the machine can be linked via the Internet. The machine includes an engine or a motor for a vehicle or a robot, an actuator for valves, and the like. The machine further includes a control module or unit for controlling another control module or unit, and a simulation machine for simulating another machine. When using a simulation machine, a control unit can be configured to be adaptive to a user on a real-time basis by applying the present invention. The characteristics of the control unit can then be adapted to a machine.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIGS. 4A(a), 4A(b), 4B(a), and 4B(b) show a specific example method of changing the search area; with A(a) and (b) showing an example of determining the next generation search area on the basis of the size of the current generation search area, and B(a) and (b) showing an example of determining it irrespective of the size of the current generation search area.

FIGS. 5A(a), 5A(b), 5B(a), and 5B(b) show other example methods of changing the search area; with A(a) and (b) showing an example of determining the next generation search area on the basis of the size of the current generation search area, and B(a) and (b) showing an example of determining it irrespective of the size of the current generation search area.

FIGS. 6A(a), 6A(b), 6B(a), and 6B(b) show still another example method of changing the search area; with A(a) and (b) showing an example of determining the next generation search area on the basis of the size of the current generation search area, and B(a) and (b) showing an example of determining it irrespective of the size of the current generation search area.

FIG. 17 shows an example of coding control parameters as gene type individuals.

FIGS. 21(a) and 21(b) show examples of data used for changing the search area size; (a) shows the data used for changing the search area size of the next generation irrespective of the current search area size, and (b) shows the data used for changing the search area size of the next generation on the basis of the current search area size.

FIGS. 24(a), 24(b), and 24(c) show the concept of flow of the next generation individual choosing process with the individuals operating section using the inter-individual distances and estimated evaluation values.

Figure 1:
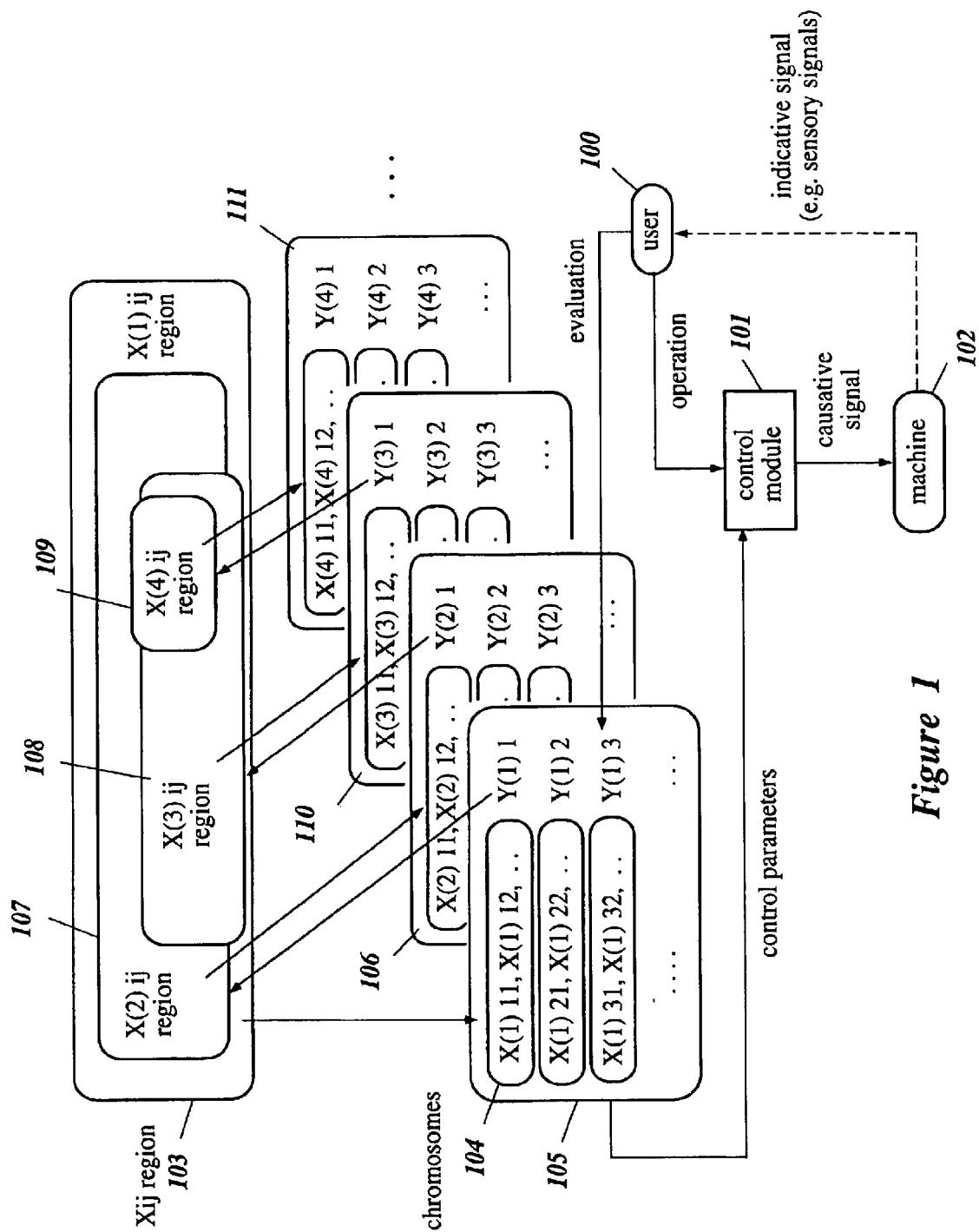
FIG. 1 is a schematic diagram showing an embodiment of the present invention.

In the drawings, the symbols or reference numerals are as follows:

1, 20, 44: Evolutionary calculating section 2, 21, 46: Initial individual creating section 3, 22, 47: Evaluation value acquiring section 4, 23, 48: Next generation individual creating section 10, 30, 45: Evolution efficiency improving section 11, 32, 50: Data storage section 12, 52: Inter-individual calculating section 13, 53: Individuals set operating section 31, 49: Search area initial value setting section 33, 51: Search area changing section 40: Engine 41: Control device 43: Optimizing device 54: Type changing section

DETAILED DESCRIPTION OF THE PREFERRED EMBODIMENTS OF THE INVENTION

The present invention can be applied to various types of machine controlled using at least one control module, the input-output relationship of which is regulated by control parameters. According to the present invention, the control module is optimized in real time, i.e., while operating the machine.

FIG. 1 is a schematic diagram showing an embodiment of the present invention. In this figure, performance of a machine 100 is controlled by at least one control module 101 having an input-output relationship regulated by control parameters. The machine 100 is operated by a user 100. However, the machine 100 can be controlled automatically, and optimization of the control module can be performed autonomously. In this figure, the first step is (a) configuring a first generation 105 of chromosomes 104 coding for the control parameters by preselecting genes $X(1)ij$ constituting the first generation of chromosomes from a selection space 103 (or $Xij$ region) used as a gene pool, and activating the machine 100 using the first generation 105 of chromosomes (one chromosome at a time). The genes are defined by coordinates in the selection space 103. The next step is (b) selecting and scoring adapted chromosome(s) by evaluating each chromosome based on signals indicative of performance of the machine 102. Scores, $Y(1)i$; may be values of absolute evaluation and can be given to each chromosome. Alternatively, scores can be assigned only to adapted chromosome(s) after selecting the adapted chromosome(s) based on relative evaluation without using scores. One chromosome or multiple chromosomes can be selected as adapted chromosome(s) which will be used as parents for a subsequent generation. In one generation, any number of chromosomes can be created. For example, 3–30 chromosomes, preferably 5–20 chromosomes, can be used depending on the type of machine and the type of control module. The number of chromosomes may be determined depending on a user's capability of recognizing changes resulting from different chromosomes.

The next steps are: (c) setting a search area 107 in the selection space 103 in accordance with the score(s) under predetermined rules (which will be explained later); (d) selecting genes $X(2)ij$ for a second generation 106 of chromosomes within the search area 107, and operating the machine 102 using the second generation 106 of chromosomes; and (e) repeating steps (b) through (d) while operating the machine 102 until desired performance of the machine 102 is demonstrated. The search area changes in accordance with the score(s) when moving to a subsequent generation. For example, a third generation 110 are created from a search area 108 which has a broader region than the search area 107 in a direction and has a narrower region than the search area 107 in another direction, depending on the predetermined rules. This is the same in a fourth generation 111 which is created from a search area 109. In some cases, a subsequent search area may be broader or narrower than the previous area in all directions.

The present invention employs a method of improving evolution efficiency in optimization method using evolutionary computing to obtain individuals of higher suitability. The method comprises the steps of: forming one generation with a group of individuals, and performing calculation using individuals of at least said generation to create a group of individuals of the next generation, characterized in that a search area is provided for the individuals of the next generation in a selection space and that the individuals of the next generation are created within the search area.

In the above, the following methods can be used for configuring the search area:

1) The position and the size of the search area are changed according to the situation of evolution.

2) In 1), the position, in the selection space, of the individual that has obtained the highest evaluation value among the group of individuals of the current generation, is made the central position of the search area of the next generation.

3) In 1), a weighted average position, determined from evaluation values as weights given to respective positions of individuals in the selection space of the current generation, is made the central position of the search area of the next generation.

4) In any one of 1)–3), the size of the search area of the next generation is changed according to the evaluation values given to respective individuals of the current generation.

5) In 4), the size of the search area of the next generation is changed according to the highest of the evaluation values given to the group of individuals.

6) In 4), the size of the search area of the next generation is changed according to the average value of evaluation values given to respective individuals of the current generation.

7) In any one of 1)–3), the size of the search area of the next generation is changed according to the positions of individuals in the selection space created in the evolution process.

8) In 7), a distance between the central position of the current generation search area and the central position of the search area of the newly determined next generation is calculated, and the size of the search area of the next generation is changed according to the distance.

9) In 7), the size of the next generation search area is changed according to the central position of a newly obtained next generation search area in the current search area.

10) In any one of 1)–9), a group of candidate individuals of the next generation are created in the next generation search area, inter-individual distances between any candidate individuals of the next generation in the selection space are calculated, and individuals to be the group of the next generation are chosen from among the candidate individuals so as to restrict the position of the group of individuals of the next generation in the selection space on the basis of information on the inter-individual distances.

11) In any one of 1)–9), a group of candidate individuals of the next generation are created in the search area of the next generation, inter-individual distances between the candidate individuals and individuals up to the current generation in the selection space are calculated, and individuals to be the group of the next generation are chosen from among the candidate individuals so as to restrict the position of the group of individuals of the next generation in the selection space on the basis of information on the inter-individual distances.

12) In any one of 1)–9), a group of candidate individuals of the next generation are created in the search area of the next generation, inter-individual distances between any candidate individuals of the next generation in the selection space are calculated, also inter-individual distances between the candidate individuals and individuals of the previous generation in the selection space are calculated, and individuals to be the group of the next generation are chosen from among the candidate individuals so as to restrict the position of the group of individuals of the next generation in the selection space on the basis of information on the inter-individual distances.

13) In any one of 10)–12), individuals for which the calculated inter-individual distances are within a predetermined range are chosen to be the group of the next generation.

14) In any one of 10)–13), parameters the individuals have are represented with vectors, the differences between the same components of the vectors are determined in absolute values, and the sum of them is used as the inter-individual distance.

15) In any one of 10)–13), parameters the individuals have are represented with vectors, and the square of the norm determined for the difference of those vectors is used as the inter-individual distance.

A method for improving evolution efficiency in optimization method using evolutionary computing (hereinafter simply called the "evolution efficiency improving method") will be hereinafter described by way of several embodiments.

Figure 2:
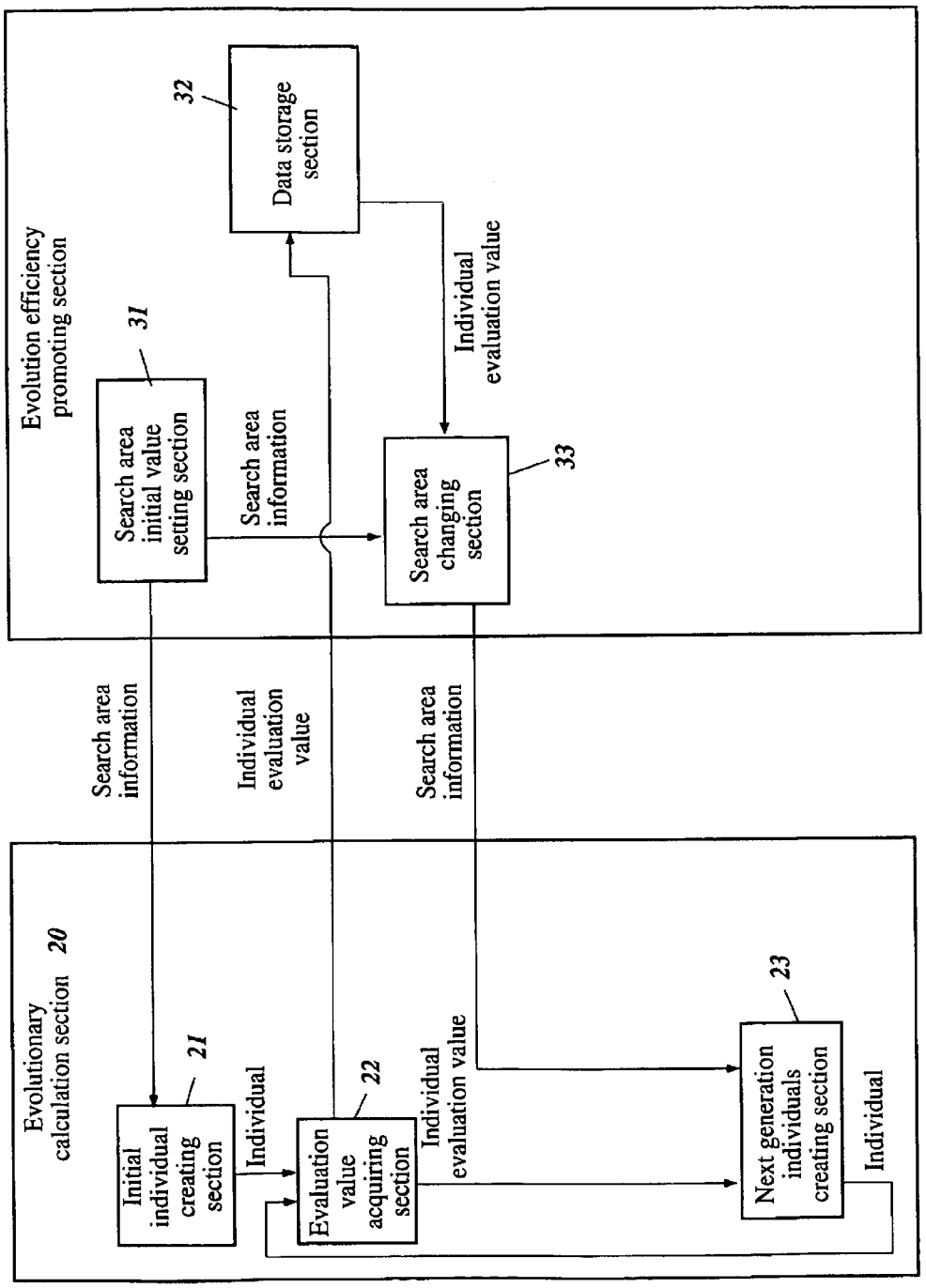
FIG. 2 is a general block diagram of an optimization device employing the method of an embodiment of this invention for improving the evolution efficiency.

FIG. 2 is a general block diagram of an optimization device employing the method of an embodiment of this invention for improving the evolution efficiency.

As shown in the figure, the optimization device comprises an evolutionary computing section (or "unit") 20 and an evolution efficiency improving section 30.

The evolutionary computing section 20 has an initial individual creating section 21, an evaluation value acquiring section 22, and a next generation individual creating section 23, to actually perform evolutionary computing such as hereditary algorithm.

The initial individual creating section 21 creates a set of initial individuals on the basis of a search area defined with the search area initial value setting section 31 of the evolution efficiency improving section 30.

The evaluation value acquiring section 22 acquires all the evaluation values of the individuals created with the initial individual creating section 21 or the next generation individual creating section 23. Concretely, evaluation values for all the individuals are acquired by repeating the operation of converting a gene type individual in the individuals set to an expression type individual and acquiring the evaluation value for the expression type individual.

The next generation individual creating section 23 creates an individuals set of the next generation within the search area defined with the search area changing section 33 of the evolution efficiency improving section 30. Incidentally, the next generation individual creating section 23 usually uses hereditary calculation such as crossing or mutation to create next generation individuals. However, the next generation individuals can be created with the following methods by narrowing the creating range of individuals by providing a search area.

To create once all the individuals that can be created within a search area, and choose individuals for the next generation out of the individuals created.

To create individuals randomly within a search area.

To create individuals by the use of the design of experiments.

The evolution efficiency improving section 30 has the search area initial value setting section 31, a data storage section 32, and the search area changing section 33.

The search area initial value setting section 31 sets the initial values of position and size of the individuals search area. The initial individual creating section 21 creates initial individuals within the search area of the initial values.

The data storage section 32 stores pieces of information on; the individuals created in the evolutionary computing section 20, the evaluation values given to the individuals, the time of creation of the individuals, etc.

Figure 3:
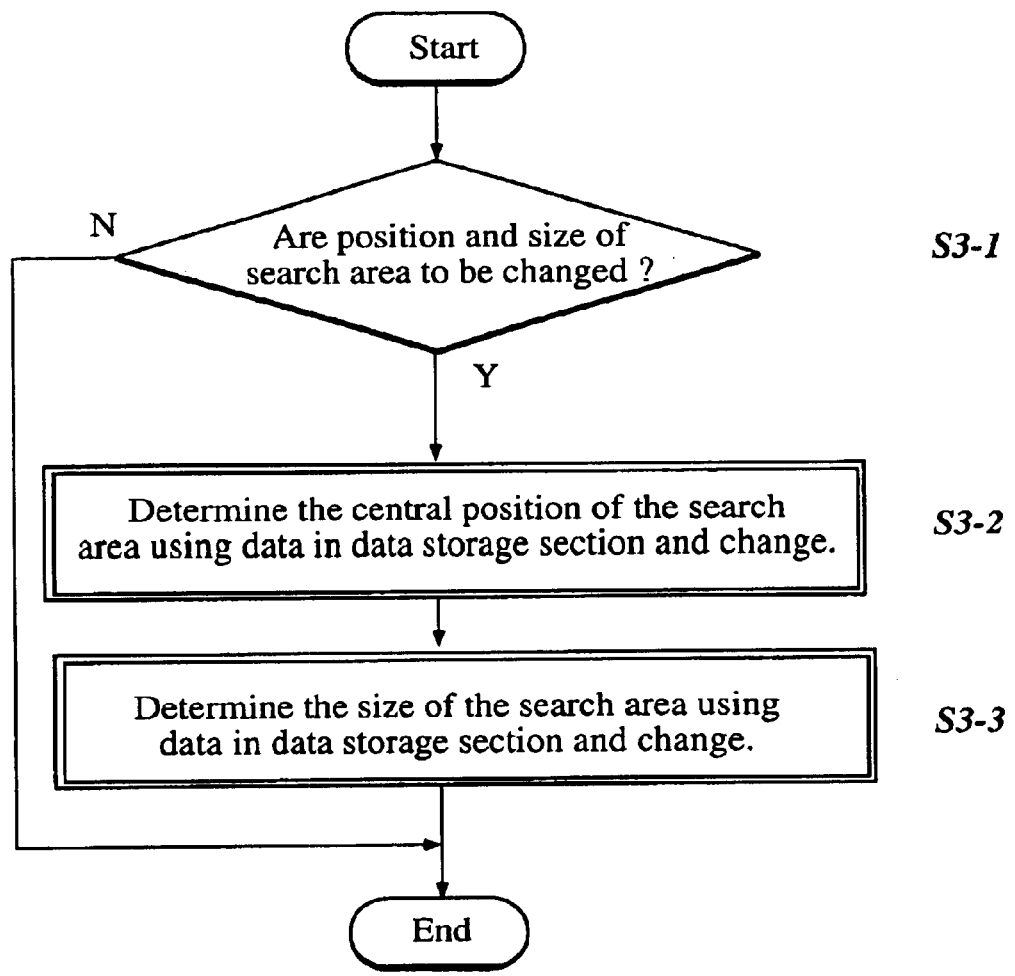
FIG. 3 is a flowchart of the process in the search area changing section 33.

The search area changing section 33 determines how to change the position and size of the search area for the individuals depending on the state of evolution so that the individuals of the next generation are created in positions nearer to optimum solutions in the next generation individual creating section 23, and changes the position and size of the search area. Specifically, as shown in the flowchart of FIG. 3, before the individuals of the next generation are created with the next generation individual creating section 23 in the evolutionary computing section 20, whether the position and size of the search area are to be changed is determined (step 3-1). If determined to be changed, the central position of the search area is determined on the basis of the data stored in the data storage section 32 and is changed (step 3-2). Then the size of the search area is determined and changed (step 3-3).

The time point of changing the position and size may be arbitrary; may be every time of generation alternation. The next generation individual creating section 23 creates the individuals of the next generation within the search area determined with the search area changing section 33.

A method of changing the position and size in the search area changing section 33 is described below.

[Changing the Position of the Search Area.]

The search area changing section 33 changes the position of the search area to an area where higher evaluation values are expected to be obtained. Specifically, there are the following two methods:

(a) The central position of the search area is assumed to be the position of the best individual of the current generation.

(b) The central position of the search area is assumed to be the weighted average position determined by weighting with evaluation values for the positions of individuals of the current generation.

Specifically for example, it is assumed that the individuals of the current generation set are Xi=(Xi1, Xi2, ..., Xin) and the evaluation values given to the individuals Xi are Yi (i=1 to N, where N is the number of individuals in the set). When the above method (a) is used, the individual Xi having the greatest value of Yi is set as the central position Xc=(Xc1, Xc2, ..., Xcn) of the search area of the next generation. When the above method (b) is used, the central position Xc of the search area of the next generation is determined with the following equation.

$$Xcj = \sum_{i}^{N} xijYi \Big/ \sum_{i}^{N} Yi \quad (j=1 \text{ to } n) \tag{5}$$

Therefore, in case a generation is made up of three individuals; X1=(20, 50), X2=(40, 30), and X3=(100, 20); and the evaluation value given to the individual X1 is Y1=70, the evaluation value given to the individual X2 is Y2=90, and the evaluation value given to the individual X3 is Y3=40, the central position Xc of the search area of the next generation determined using the methods (a) and (b) becomes as follows. With the method (a), the individual X2=(40, 30) provided with the highest evaluation value Y2 becomes the central position Xc of the search area of the next generation.

With the method (b), $Xc1=(20\times70+40\times90+100\times40)/(70+90+40)=9000/200=45$ $Xc2=(50\times70+30\times90+20\times40)/(70+90+40)=7000/200=35$ The central position of the search area of the next generation Xc=(45, 35)

[Changing the Size of the Search Area.]

The search area changing section 33 reduces the size of the search area of the individuals of the next generation when the individuals of the current generation are expected to be near the optimum solution, and increases the size when the individuals of the current generation are expected to be distant from the optimum solution. Specifically, four methods, (c) to (e) below, can be enumerated.

(c) To change according to the evaluation value of the best individual of the current generation.

(c-1) The greater is the evaluation value of the best individual of the current generation, the smaller is made the search area.

(c-2) The greater is the value calculated by subtracting the average value of the evaluation values given to all the individuals created up to the current generation from the evaluation value of the best individual of the current generation, the smaller is made the search area.

(c-3) The greater is the value calculated by subtracting the average value of the evaluation values given to the individuals of the current generation from the evaluation value of the best individual of the current generation, the smaller is made the search area.

The size of the search area may be changed either on the basis of, or irrespective of the size of the current generation search area.

A more specific example of the above method (c-1) is described below in reference to FIG. 4.

FIG. 4A shows an example of determining the size of the next generation search area on the basis of the size of the current generation search area by the use of the above method (c-1). Here, the size (X1, X2) of the search area represents the distance from center to edge in the direction X1 of the search area and the distance from center to edge in the direction X2 of the search area. As shown in the table of FIG. 4A(a), the search area changing section 33 has pre-stored data of the amount of change in the search area size (center-to-edge distance) for the evaluation value Y of the best individual, and changes the size of the search area on the basis of the table. Therefore, for example, if the best evaluation value Y of the i-th generation is 90, according to the table of FIG. 4A(a), the amounts of changes in the search area size in directions X1 and X2 are −10 and −5. As shown in FIG. 4A(b), the size of the next generation search area becomes (10, 15) on the basis of the size (20, 20) of the i-th generation search area. In the FIG. 4A(b), the white circle indicates the search area center position of the i-th generation, the white square indicates the search area of the i-th generation, the black circle indicates the search area center position of the (i+1)-th generation, and the hatched square indicates the search area of the (i+1)-th generation.

FIG. 4B shows an example of determining the size of the next generation search area irrespective of the size of the current generation search area using the above method (c-1). As shown in the table of FIG. 4B(a), the search area changing section 33 has previously stored data of the amount of change in the search area size (center-to-edge distance) for the evaluation value Y of the best individual, and changes the size of the search area on the basis of the table. Therefore, for example, if the best evaluation value Y of the i-th generation is 90, according to the table of FIG. 4B(a), since the search area size is (10, 15), the size of the search area of the (i+1)th generation is made (10, 15) irrespective of the search area size of the i-th generation.

(d) To change according to the average of evaluation values given to the current generation individuals.

(d-1) The greater is the average of evaluation values given to the current generation individuals, the smaller is made the search area.

(d-2) The greater is the value calculated by subtracting the average value of the evaluation values given to all the individuals created up to the current generation from the average value of the evaluation values given to the individuals of the current generation, the smaller is made the search area.

The size of the search area may be changed either on the basis of, or irrespective of the size of the current generation.

(e) To change according to the shift distance of the central position of the search area.

The longer is the distance between the centers of current and next generation search areas, the greater is made the search area.

A more specific example of the above method (e) is described below in reference to FIG. 5.

FIG. 5A shows an example of determining the size of the next generation search area using the above method (e), on the basis of size of the current generation search area. As shown in the table of FIG. 5A(a), the search area changing section 33 has pre-stored data of the amount of change in the search area size (center-to-edge distance) corresponding to the search area center position shift distance (d), namely the distance (d) between the i-th generation search area center position and the (i+1)th generation search area center position, and changes the size of the search area on the basis of the table. Therefore, for example, if the search area center position shift distance (d) is 5, according to the table of FIG. 5A(a), the amounts of changes in the search area size in X1 and X2 directions are −10 and −5, as shown in FIG. 5A(b), the size of the search area of the next generation becomes (10, 15) on the basis of the search area size (20, 20) of the i-th generation.

In the FIG. 5A(b), the white circle indicates the search area center position of the i-th generation, the white square indicates the search area of the i-th generation, the black circle indicates the search area center position of the (i+1)-th generation, and the hatched square indicates the search area of the (i+1)-th generation.

FIG. 5B shows an example of determining the size of the next generation search area irrespective of the size of the current generation search area using the above method (e). As shown in the table of FIG. 5B(a), the search area changing section 33 has previously stored data of the search area size (center-to-edge distance) corresponding to the search area center position shift distance (d), and changes the size of the search area on the basis of the table. Therefore, for example, if the center position shift distance (d) is 5, according to the table of FIG. 5B(b), since the search area size is (10, 15), the size of the search area of the (i+1)th generation is made (10, 15) irrespective of the search area size of the i-th generation.

(f) To change according to the next generation search area center position in the current search area.

The more distant is the next generation search area center position in the current search area from the current search area center, the greater is made the area.

A more specific example of the above method (f) is described in reference to FIG. 6. Here, the area of not less than $\alpha\%$ and less than $\beta\%$ of the search area is "the area of the size $(X1\times\beta/100, X2\times\beta/100)$ from the search area center" excluding "the area of the size $(X1\times\alpha/100, X2\times\alpha/100)$ from the search area center." FIG. 6A shows an example of determining the size of the next generation search area using the above method (f), on the basis of the size of the current generation search area. As shown in the table of FIG. 6A(a), the search area changing section 33 has pre-stored data of the amount of change in the search area size (center-to-edge distance) to be applied to the data of the area in the current search area where the next generation search area center position is created, and changes the size of the search area on the basis of the table. Therefore, as shown in FIG. 6A(b) for example, if the search area center position of the (i+1)-th generation is in the area of 0% up to less than 25% from the current search area center, the amounts of change in the size of the search area in X1 and X2 directions are −10 and −5. Therefore, as shown in FIG. 6A(b), the size of the search area of the next generation becomes (10, 15) on the basis of the search area size (20, 20) of the i-th generation. In the FIG. 5A(b), the white circle indicates the search area center position of the i-th generation, the white square indicates the search area of the i-th generation, the black circle indicates the search area center position of the (i+1)-th generation, the hatched square indicates the search area of the (i+1)-th generation, and the dotted-line square indicates the area of 0% to 25% of the center position of the i-th generation.

FIG. 6B shows an example of determining the size of the next generation search area irrespective of the size of the current generation search area using the above method (f). As shown in the table of FIG. 6B(a), the search area changing section 33 has pre-stored data of the amount of change in the search area size (center-to-edge distance) to be applied to the data of in which area in the current search area the center position of the next generation search area is created, and changes the search area size on the basis of the table. Therefore, as shown in FIG. 6B(b) for example, if the search area center position of the (i+1)-th generation is in the area between 0% to less than 25% from the current search area center, since the search area center becomes (10, 15), the search area size of the (i+1)-th generation is made (10, 15) irrespective of the size of the i-th generation search area.

Figure 7:
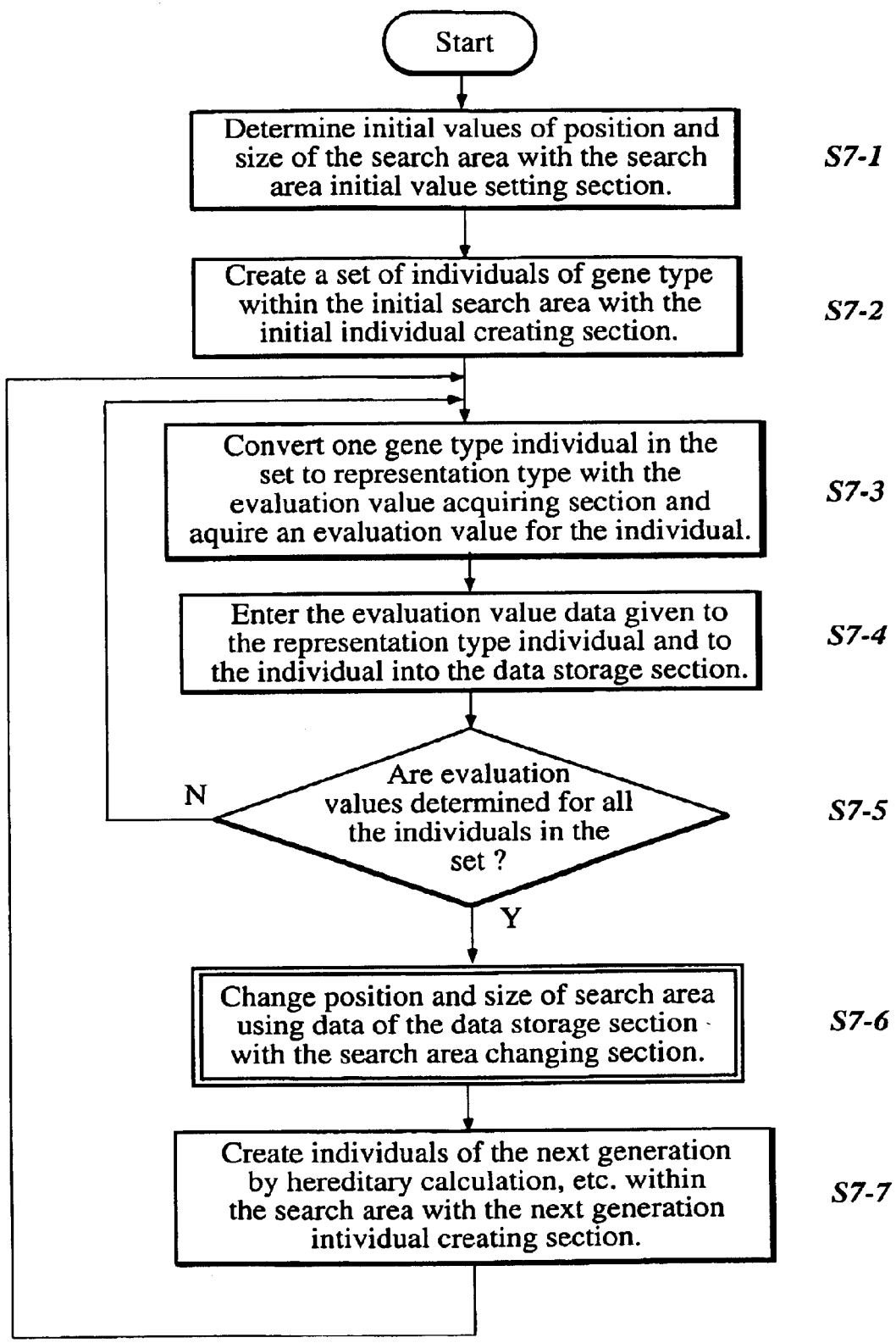
FIG. 7 is a flowchart of an evolutionary computing process in the evolutionary computing section 20 and in the evolution efficiency improving section 30.

The flow of the evolutionary computing process in the evolutionary computing section 20 and the evolution efficiency improving section 30 constituted as described above will be described below in reference to a flowchart shown in FIG. 7.

First, the initial values of the position and size of the search area (initial search area) are determined with the search area initial vale setting section 31 (step 7-1).

Next, a set of gene type of individuals within the initial search area are created with the initial individual creating section 21 (step 7-2).

Then, one of the gene type individuals in the set is converted to an expression type individual, and the evaluation for the individual is acquired with the evaluation value acquiring section 22 (step 7-3).

And, data of the individual and the evaluation value given to the individual are stored in the data storage section 32 (step 7-4).

A judgment is made whether evaluation values for all the individuals in the set are obtained (step 7-5). If the evaluation values are not obtained for all the individuals, the steps 7-3 and 7-4 are repeated. After the evaluation values are obtained for all the individuals, the position and size of the next generation search area are determined with the search area changing section 33 on the basis of the data stored in the data storage section 32 (step 7-6).

Then, with the next generation individual creating section 23, a set of gene type individuals are created within the new search area created with the search area changing section 33 by hereditary calculation or the like (step 7-7).

Here, another example method of improving the efficiency of evolution, that can be combined with the above-described evolution efficiency improving method of the invention, will be described.

Figure 8:
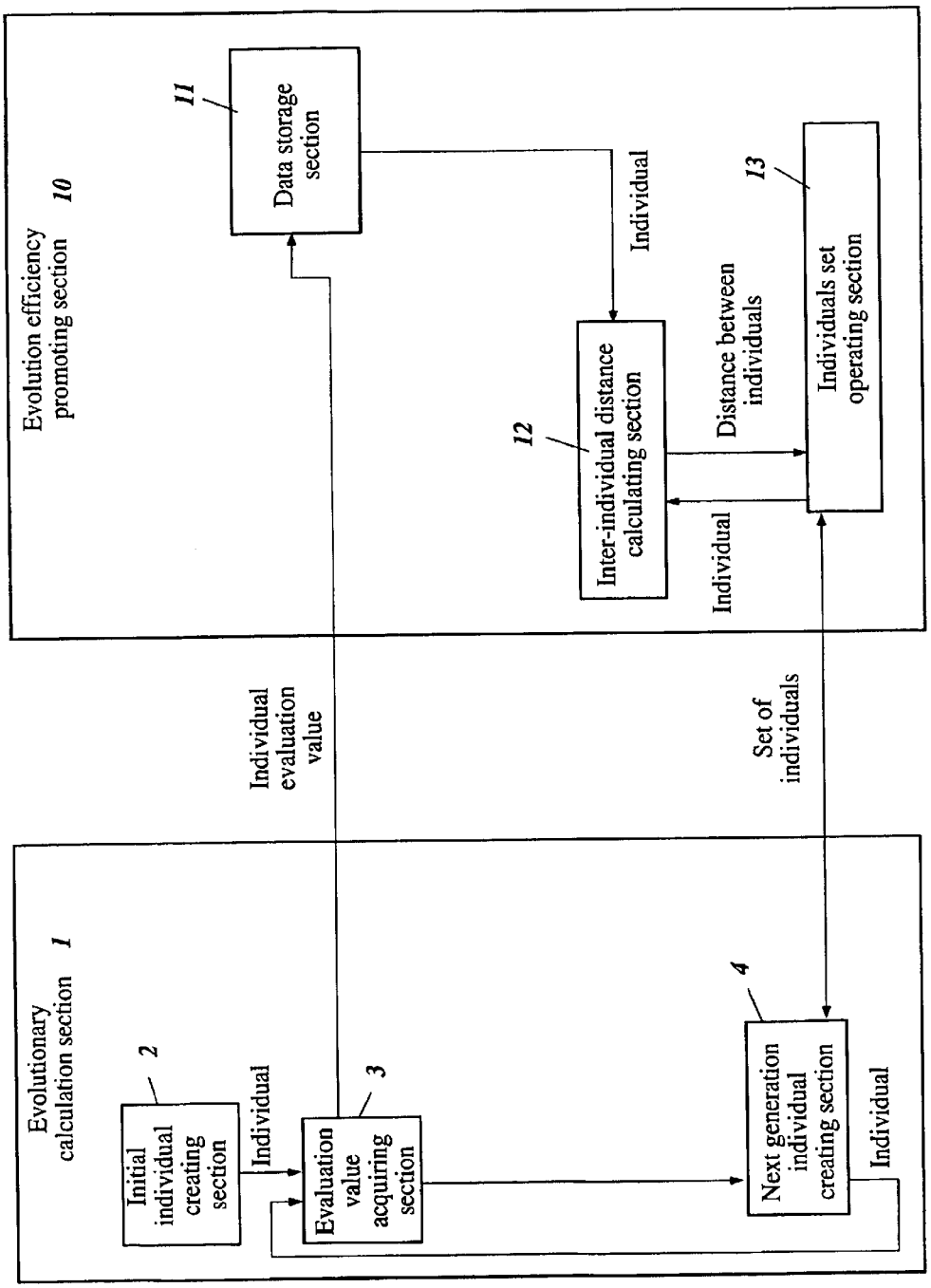
FIG. 8 is a general block diagram explaining an inter-individual distance calculating section usable in the method of an embodiment of this invention

FIG. 8 is a general block diagram explaining an inter-individual distance calculation section which is useable in the present invention. In this figure, the search area changing section is not indicated for convenience.

As shown in the figure, the optimizing device comprises an evolutionary computing section 1 and an evolution efficiency improving section 10.

The evolutionary computing section 1 has an initial individual creating section 2, an evaluation value acquiring section 3, and a next generation individual creating section 4, to actually perform evolutionary computing such as hereditary algorithm.

The initial individual creating section 2 creates a set of individuals corresponding to the first generation of gene type individuals for evolutionary computing, and starts evolution based on the individuals set.

The evaluation value acquiring section 3 acquires evaluation values for all the individuals created with the initial individual creating section 2 or the next generation individual creating section 4. Specifically, the section 3 repeats the steps of converting a gene type individual in the individuals set to expression type individual and of acquiring the evaluation value for the expression type individual, to acquire evaluation values for all the individuals.

The next generation individual creating section 4 converts each evaluation value acquired with the evaluation value acquiring section 3 to a suitability degree, performs calculation to acquire a higher evaluation value, and creates gene type individuals set of the next generation.

The evolution efficiency improving section 10 comprises a data storage section 11, an inter-individual distance calculating section 12, and an individuals set operating section 13.

The data storage section 11 stores pieces of information on such items as individuals created with the evolutionary computing section 1, the evaluation values given to the individuals, and the time of creating the individuals, in succession.

The inter-individual distance calculating section 12 calculates the distance between any two individuals. The term "distance" here means a numerical expression of the extent of difference between two individuals in question. The type of the individuals as the objects of calculating the distance may be either gene type or expression type. To calculate the distance, the following two methods may be enumerated:

(g) The parameters the individuals have are represented with vectors, the differences between the same components of the vectors are determined in absolute values, and the sum of them is used as the inter-individual distance.

Specifically, in case the distance between individuals Xa and Xb is calculated, the parameters the individuals respectively have are expressed with vectors using equations (1) and (2) below. The sum of differences in absolute values between respective components is calculated with the equation (3) and is used as the inter-individual distance.

$$\text{Individual } Xa = (Xa1, Xa2, \ldots, Xan) \quad (1)$$

$$\text{Individual } Xb = (Xb1, Xb2, \ldots, Xbn) \quad (2)$$

$$\text{Inter-individual distance} = \sum_{i}^{n} |Xai - Xbi| \quad (3)$$

Therefore, according to this method (g), the inter-individual distance between for example Xa=(20, 30, 15) and Xb=(25, 30 25) is calculated as follows:

$$\text{Inter-individual distance} = |20 - 25| + |30 - 30| + |15 - 25|$$
$$= 5 + 0 + 10$$
$$= 15$$

(h) The parameters the individuals have are represented with vectors, and the square of the norm determined for the difference of those vectors is used as the inter-individual distance.

Specifically, to calculate the distance between individuals Xa and Xb, the parameters the individuals respectively have are expressed with vectors using equations (1) and (2) below. The square of the norm obtained for the difference between the vectors using the equation (4) below, and the result is used as the inter-individual distance.

$$\text{Inter-individual distance} = \|Xa - Xb\|^2 \quad (4)$$
$$= \sum_{i}^{n} |Xai - Xbi|$$

Therefore, with this method (h), the inter-individual distance between for example Xa=(20, 30, 15) and Xb=(25, 30 25) is calculated as follows:

$$\text{Inter-individual distance} = (20 - 25)^2 + (30 - 30)^2 + (15 - 25)^2$$
$$= 25 + 0 + 100$$
$$= 125$$

The individuals set operating section 13 chooses individuals for use as the next generation individuals from the set of next generation candidate individuals created with the next generation individuals creating section 4 in the evolutionary computing section 1 on the basis of the inter-individual distance calculated with the inter-individual distance calculating section 12.

Figure 9:
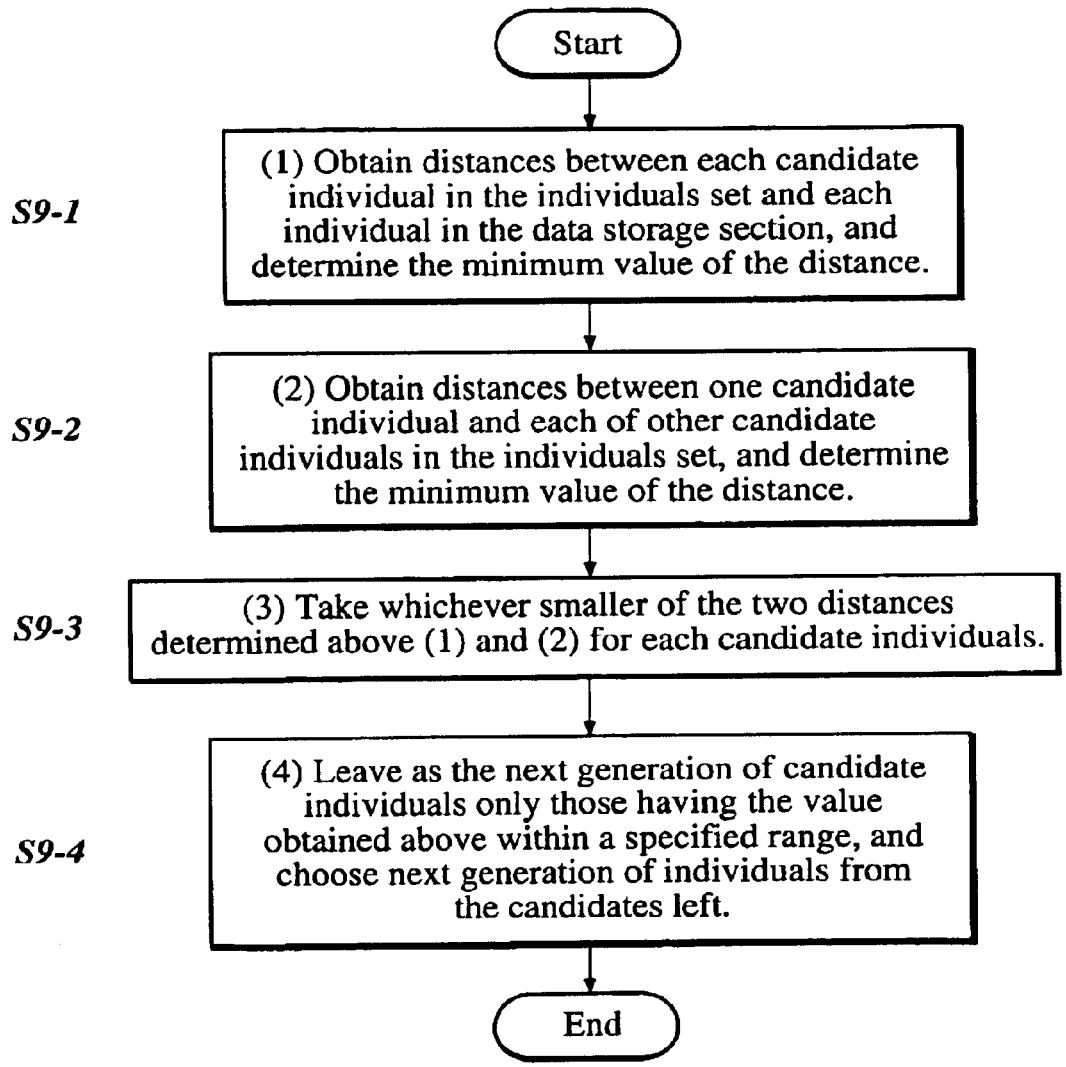
FIG. 9 is a flowchart of the process of the next generation individual choosing method on the basis of inter-individual distances.

A method of choosing the next generation individuals on the basis of the inter-individual distance is described below in reference to a flowchart shown in FIG. 9.

First, inter-individual distance is calculated between each candidate individual in the individuals set and each individual in the data storage section 11 to determine a minimum value of the inter-individual distance (step 9-1).

Next, inter-individual distances are calculated between one and the rest all of the candidate individuals in the individuals set to determine a minimum value of the inter-individual distance (step 9-2).

For each candidate individual, the minimum value is determined from the two distances obtained in the above steps 9-1 and 9-2 (step 9-3).

And, individuals, each having a minimum value determined as described above falling within a specified range, are chosen as the next generation individuals (step 9-4).

Incidentally, in the above-described example, the minimum value is determined in the step 9-3 out of the two distances determined in the steps 9-1 and 9-2, and the next generation individuals are chosen in the step 9-4 on the basis of the value determined in the step 9-3. However, the method of choosing the next generation individuals is not limited to the above example but may be a method in which the next generation individuals are chosen on the basis of whether one or both of the two distances determined in the steps 9-1 and 9-2 is or are within a specified range.

Figure 10A:
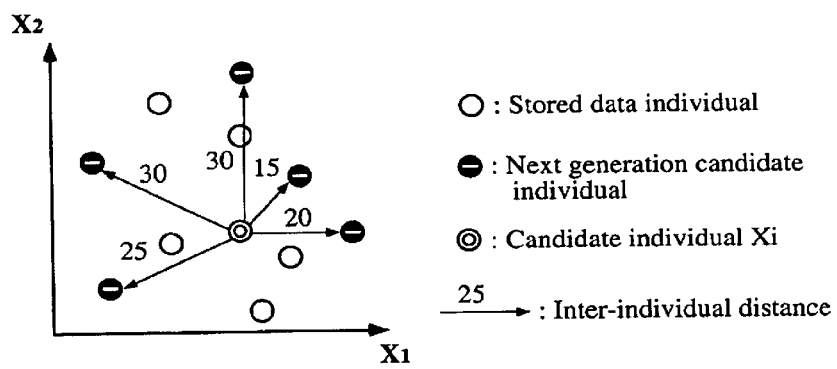
FIGS. 10(a) and 10(b) both show the relation between the individuals stored in the data storage section 11 and the next generation candidate individuals created in the next generation individuals creating section 4.
Figure 10B:
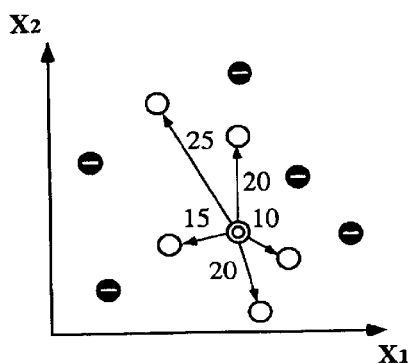

Referring to FIG. 10, the above method of choosing the next generation individuals is more specifically described below.

Both of the FIGS. 10(*a*) and 10(*b*) show the relation between the individuals stored in the data storage section 11 (indicated with white circles in the figures) and the next generation candidate individuals (black circles in the figures) created with the next generation individuals creating section 4. The numerals provided along the arrows in the figures show the inter-individual distances determined in the above methods (g) and (h).

First, according to the process of the step 1, inter-individual distances between any candidate individual Xi and any other candidate individual are found for all the candidate individuals, and the smallest of them is made di1. In FIG. 10(*a*), di1=15.

Next, according to the process of the step 2, inter-individual distances between any candidate individual Xi and each candidate individual stored in the data storage section 11 are found for all the candidate individuals, and the smallest of them is made di2. In FIG. 10(*b*), di2=10.

Further, of the di1 and di2 found, the smaller one is found and assumed to be di. In FIG. 10, since di1=10 and di2=15, di=10.

Whether the di found as described above meets a specified equation of condition is judged. If it meets the condition, the candidate individual Xi is left as a next generation individual, and if it does not meet condition, the candidate individual Xi is not left as a next generation individual.

Specifically for example, if the conditional equation is 5<di<15, the candidate individual Xi is left as a next generation individual.

Figure 11:
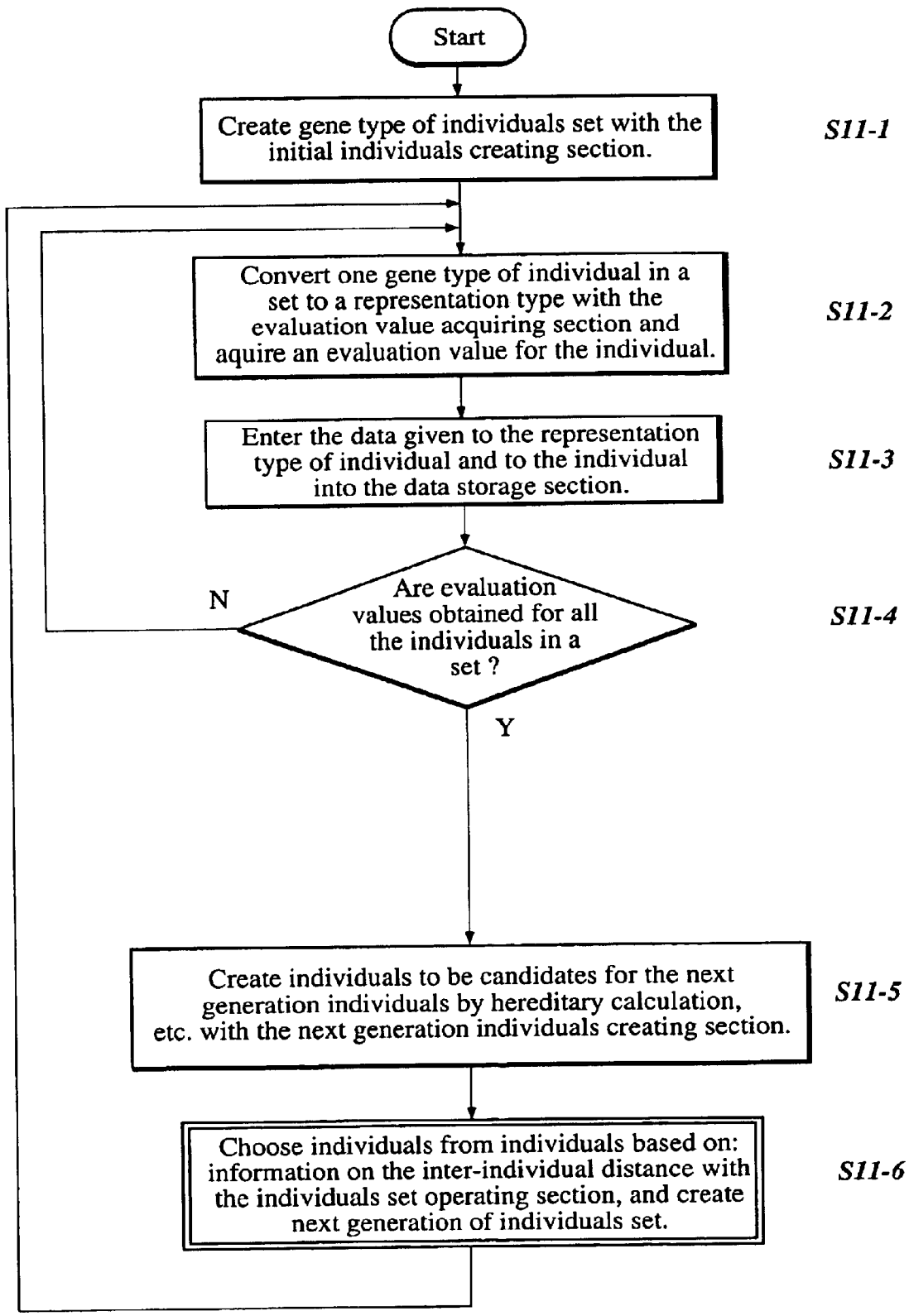
FIG. 11 is a flowchart of an evolutionary computing process in the evolutionary computing section 1 and in the evolution efficiency improving section 10.

The flow of the evolutionary computing process with the evolutionary computing section 1 and the evolution efficiency improving section 10 constituted as described above is described below using the flowchart of FIG. 11.

First, a set of gene type individuals are created with the initial individual creating section 1 (step 11-1).

Next, in the evaluation value acquiring section 2, one gene type individual in the set of gene type individuals is converted to expression type, and its evaluation value is acquired (step 11-2).

And, data of the individual and the evaluation value given to the individual are stored in the data storage section 11 (step 11-3).

Whether evaluation values are obtained for all the individuals in the set is judged (step 11-4). If not, the processes of the steps 2 and 3 are repeated. If evaluation values are obtained for all the individuals, candidate individuals to be the candidates for the next generation individuals are created with the next generation individuals creating section 4 by hereditary calculation or the like (step 11-5).

In the individuals set operating section 13, individuals for use as the next generation individuals are chosen from the set of next generation candidate individuals created with the next generation individuals creating section 4 on the basis of the inter-individual distance information calculated with the inter-individual distance calculating section 12 (step 11-6) to create a set of the next generation individuals (step 11-6).

Finally, an embodiment of a control device is described below in which the above-described two evolution efficiency improving methods are combined together and applied to change the throttle characteristic of a motorcycle.

Figure 12:
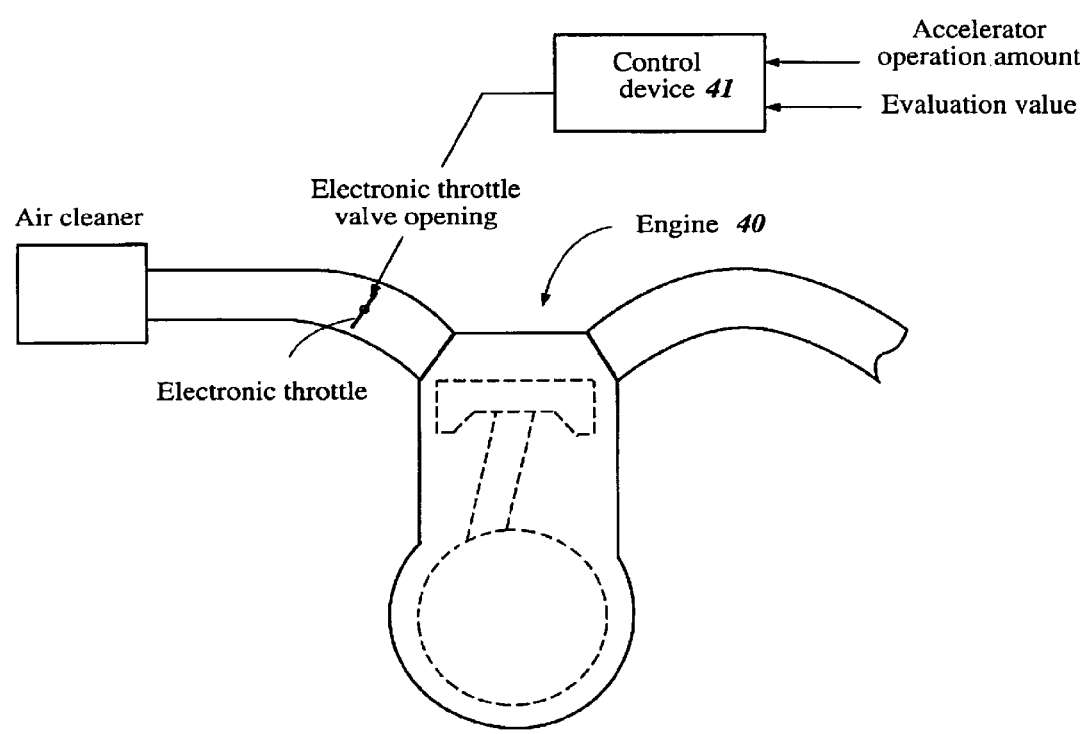
FIG. 12 generally shows the relation between an engine 40 and a control device 41 employing the evolution efficiency improving method of an embodiment of this invention.

FIG. 12 generally shows the relation between an engine 40 and a control device 41 to which is applied the evolution efficiency improving method of an embodiment of this invention.

The engine 40 has an electronic throttle device controlled through a control device 41 based on the amount of accelerator operation by a user. The control device 41 is constituted to provide throttle characteristic matching the preference of the user.

As shown in the figure, the control device 41 receives the information on the user's acceleration operation amount and determines the electronic throttle valve opening according to the received information.

[Description of the Control Device 41]

Figure 13:
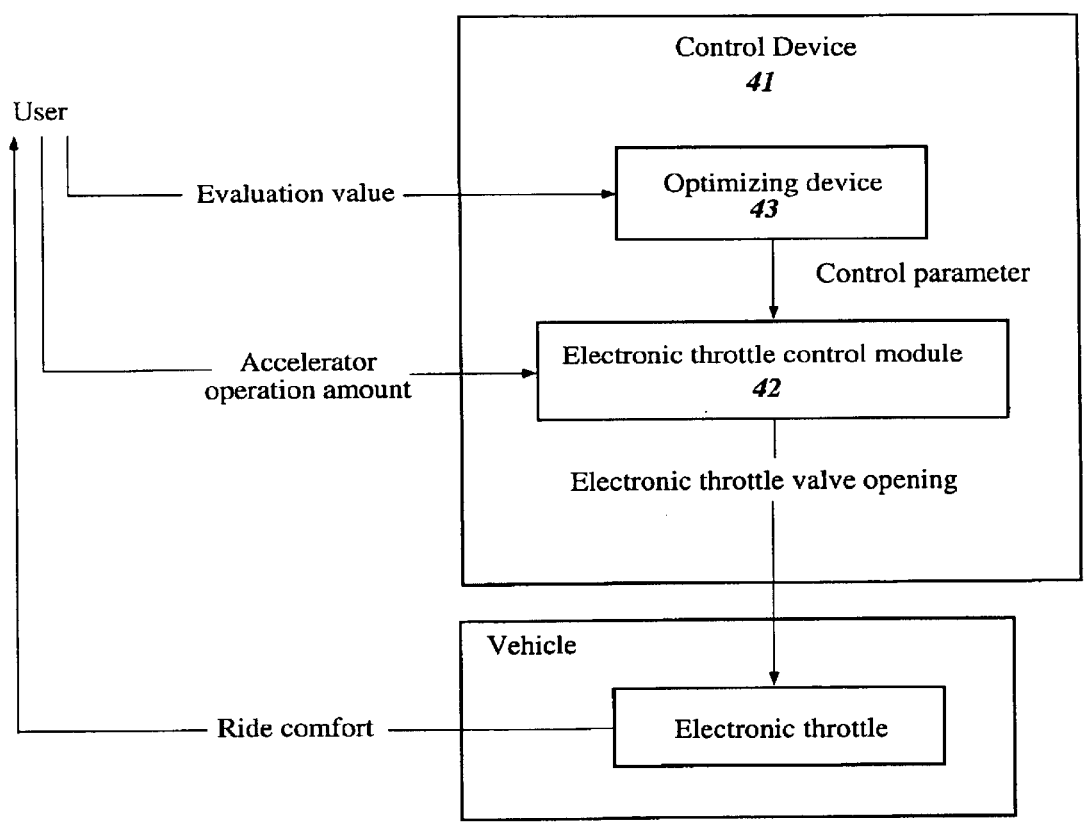
FIG. 13 is a general block diagram of the control device 41.

FIG. 13 is a general block diagram of the control device 41.

As shown in the figure, the control device 41 has an electronic throttle control module 42 for determining the electronic throttle valve opening according to the accelerator operation amount, and an optimizing device 43 for optimizing the control parameter of the electronic throttle control module according to the user' evaluation while actually using a vehicle with the engine so that the throttle characteristic matching the preference of the user is provided.

[Description of the Electronic Throttle Control Module]

Figure 14:
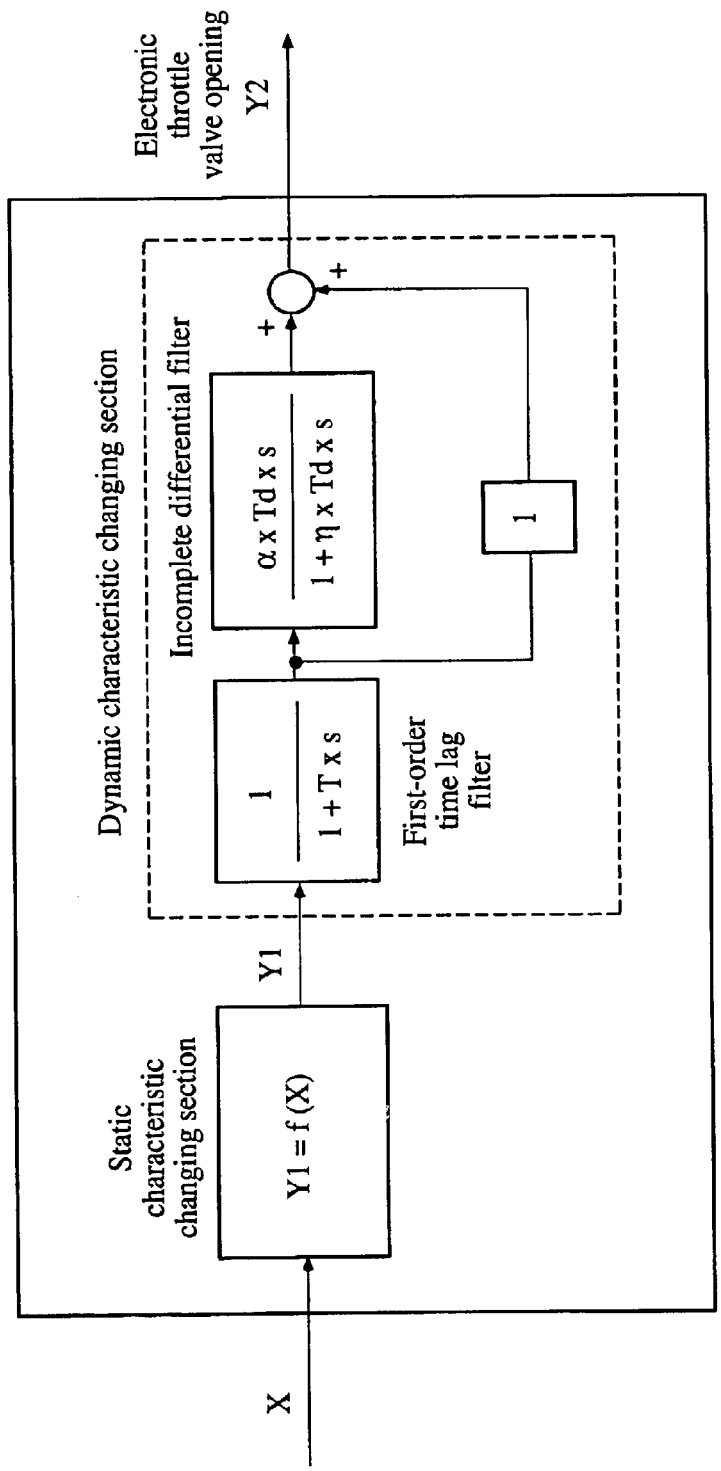
FIG. 14 is a general block diagram of an electronic throttle control module.

The electronic throttle control module, as shown in FIG. 14, is constituted to determine the electronic throttle valve opening according to the amount of the accelerator operation made by the user, and generally has a static characteristic changing section and a dynamic characteristic changing section. Incidentally, the term "accelerator operation amount" as used herein refers to the information resulting from the user's actual operation of the accelerator (not shown), and includes a piece of information on the "accelerator opening" and another piece of information on the "amount of change in the accelerator."

Here, the characteristic of the electronic throttle valve is briefly described. The electronic throttle valve has two, static and dynamic, characteristics.

Figure 15:
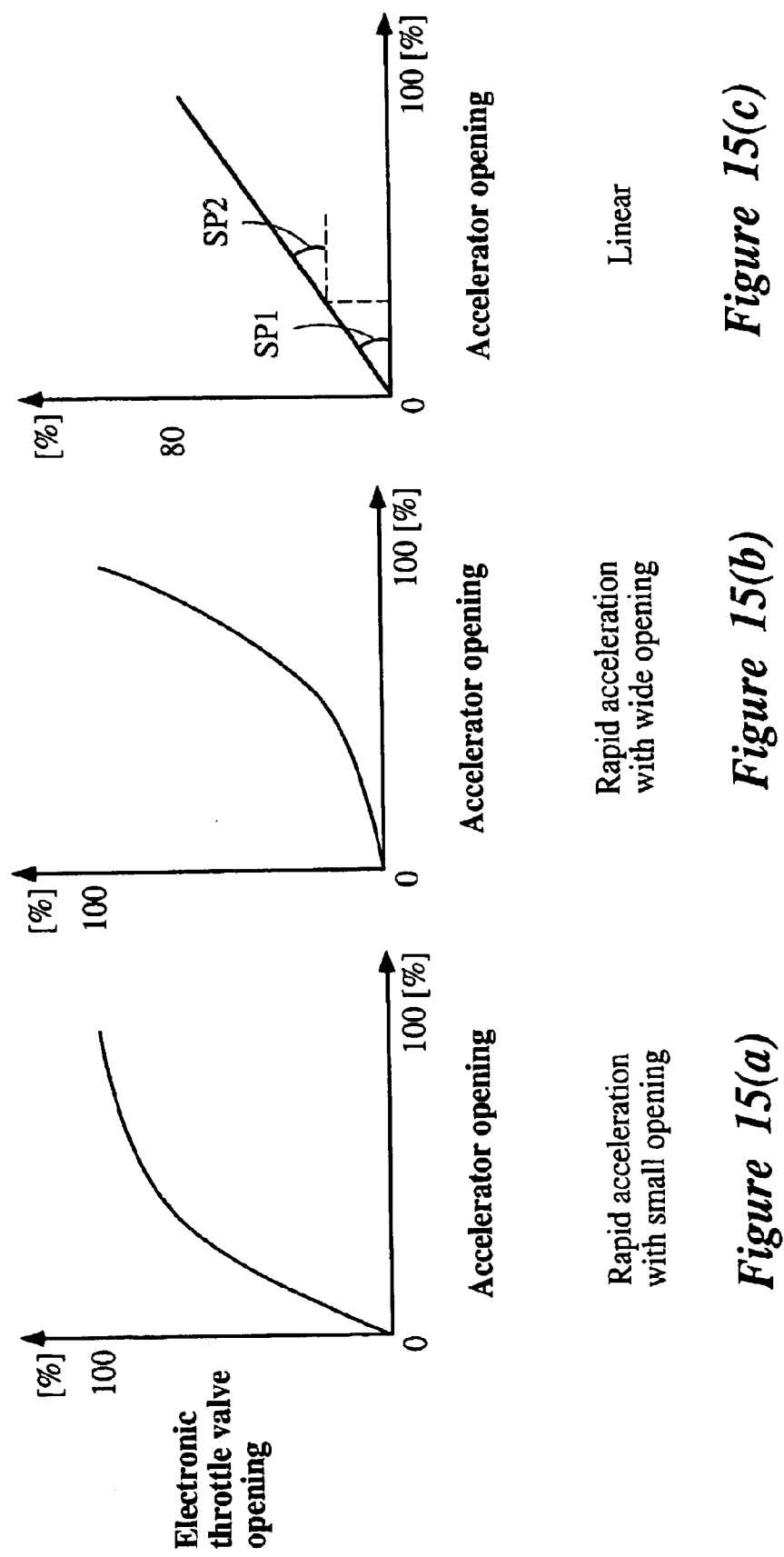
FIGS. 15(a), 15(b), and 15(c) shows examples of static characteristics of several throttle devices.

The former characteristic stems from the relation between the accelerator opening (operation amount) and the electronic throttle valve opening, and affects the stationary running characteristic of the vehicle. FIG. 15 shows several examples of the static throttle characteristic. Changing the static characteristic in this way makes it possible to provide different degrees of electronic throttle valve opening with the same degree of accelerator opening according to different types of setting such as:

A small opening-rapid acceleration type in which the electronic throttle valve opens relatively wide while the accelerator opening is small, and the electronic throttle valve gradually reaches the full opening beyond a certain degree of accelerator opening (FIG. 15(*a*)).

A wide opening-rapid acceleration type in which the electronic throttle valve opens gradually while the accelerator opening is small, and the electronic throttle valve rapidly reaches the full opening as the accelerator opening increases (FIG. 15(*b*)).

A proportional type in which the electronic throttle valve opens in proportion to the accelerator opening (FIG. 15(*c*)).

The static characteristic has only to be that the electronic throttle valve opening increases or remains unchanged as the accelerator opening increases, and can be expressed with various functions. In this embodiment, the static characteristic is optimized for the throttle valve opening rate SP1 with the accelerator opening of 0 to 20%, and for the throttle valve opening rate SP2 with the accelerator opening of 20 to 100%.

Figure 16:
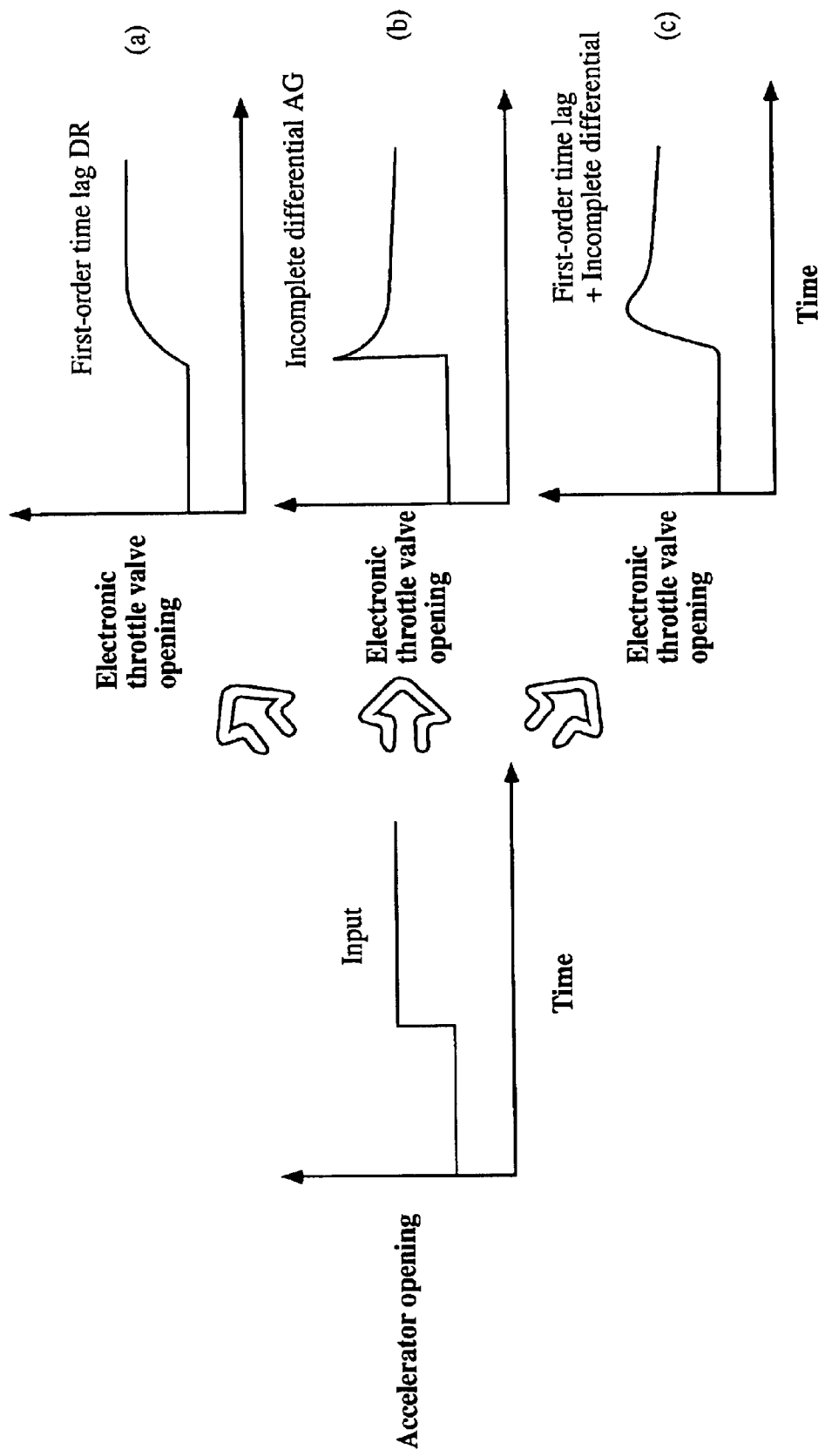
FIG. 16 shows examples of dynamic characteristics of several throttle devices.

The latter, the dynamic characteristic of the electronic throttle valve stems from the relation between the changing speed of the accelerator and the changing speed of the electronic throttle valve, and affects the transient characteristic of the vehicle. This characteristic may be specifically constituted by combining the first-order time lag and the incomplete differential to change the changing speed of the electronic throttle valve relative to the changing speed of the accelerator. Combining the first-order time lag and the incomplete differential in this way makes it possible to provide different types of dynamic characteristic as shown in FIG. 16:

A slow response type with which the electronic throttle valve opens relatively slowly with the accelerator operation (FIG. 16(*a*)).

A quick response type with which the electronic throttle valve follows the accelerator operation quickly although some spikes occur (FIG. 16(*b*)).

A type intermediate of the above two (FIG. 16(*c*)).

In this embodiment, the dynamic characteristic is optimized by optimizing the first-order time lag constant DR and the acceleration compensation factor AG.

[Description of the Optimizing Device]

Figure 17:
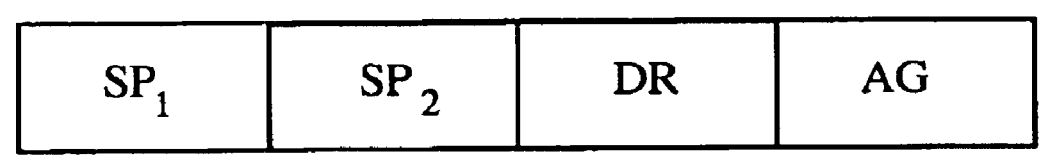

The optimizing device 43 codes as shown in FIG. 17 the control parameters (throttle valve opening rates SP1 and SP2, first-order taime lag constant DR, and acceleration compensation factor AG) in the electronic throttle control module 42 as gene type individuals, and optimizes these control parameters.

Figure 18:
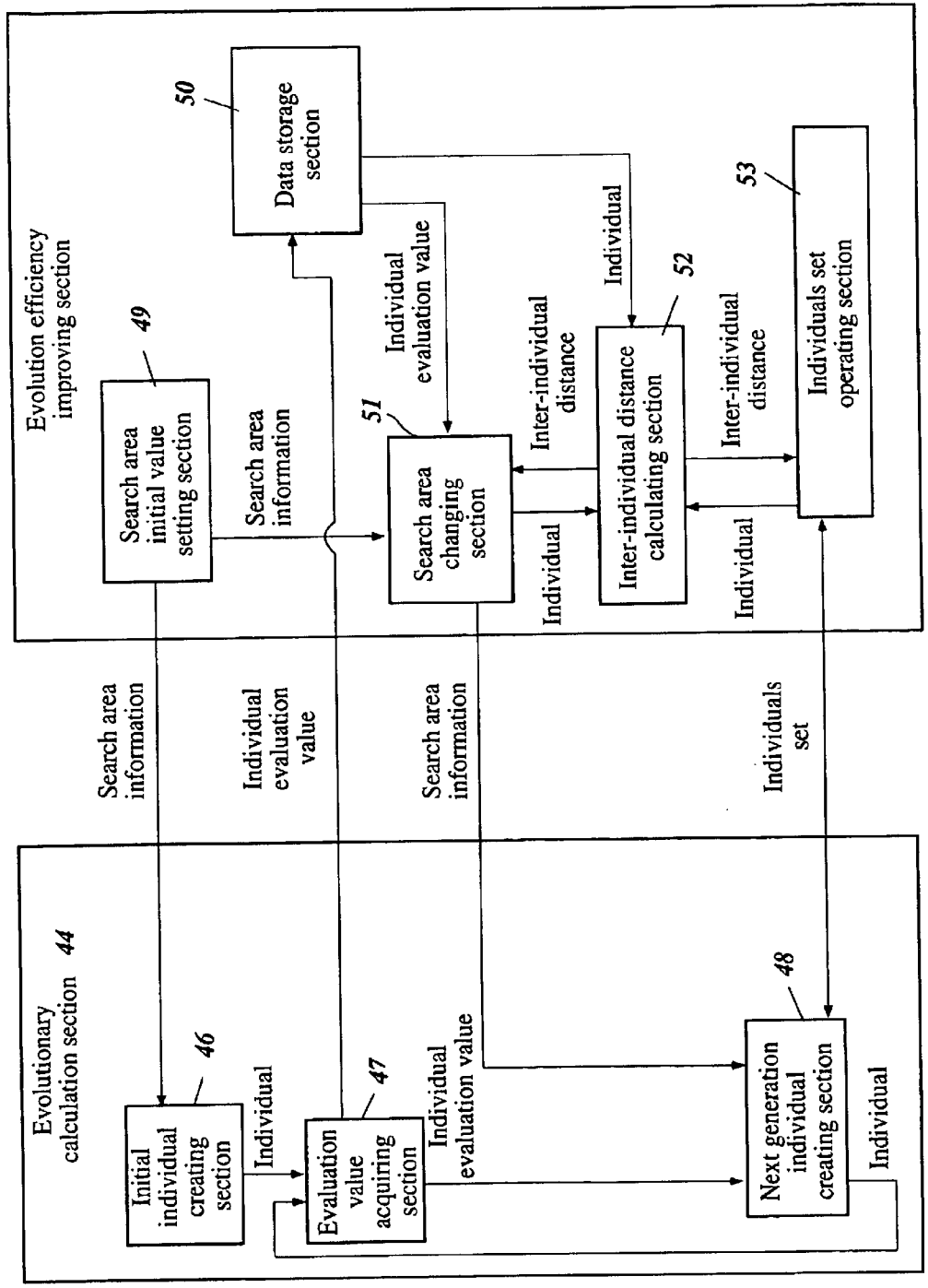
FIG. 18 is a general block diagram of the optimizing device 43.

FIG. 18 is a general block diagram of the optimizing device 43.

As shown in FIG. 18, the optimizing device 43 is provided with an evolutionary calculating section 44 and an evolution efficiency improving section 45.

The evolutionary calculating section 44 has an initial individual creating section 46, an evaluation value acquiring section 47, and a next generation individuals creating section 48. The evolution efficiency improving section 45 has a search area initial value setting section 49, a data storage section 50, a search area changing section 51, an inter-individual distance calculating section 52, and an individuals set operating section 53.

Figure 19:
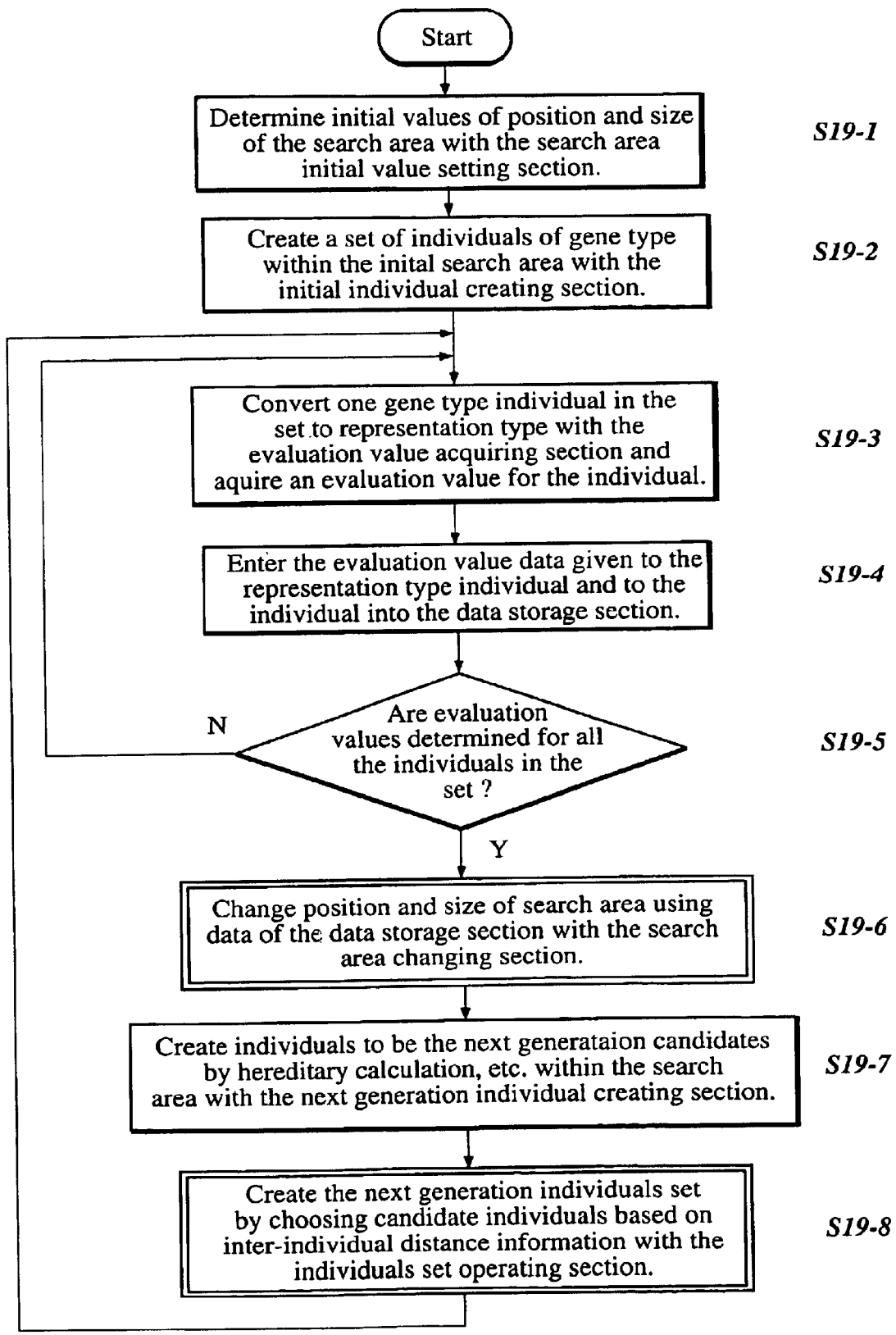
FIG. 19 is a flowchart of the process in the optimizing device 43.

The flow of process in the optimizing device 43 constituted as described above is described below in reference to the flowchart of FIG. 19.

First, initial values of position and size of the search area for individuals are determined with the search area initial value setting section 49 (step 19-1).

Next, a set of gene type individuals are created within the range of the initial search area with the initial individual creating section 46 (step 19-2).

Figure 20:
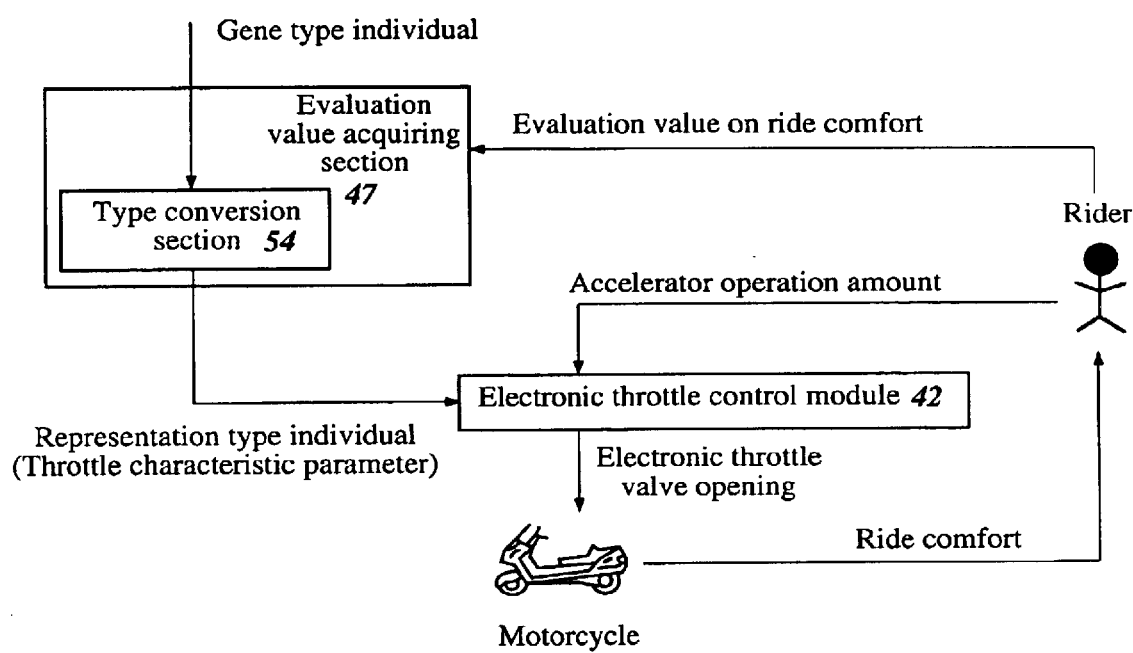
FIG. 20 shows an example flow of evaluation value acquiring method in the evaluation value acquiring section 47.

After the set of gene type individuals are created, one gene type individual in the individuals set is converted to an expression type with the evaluation value acquiring section 47, and an evaluation value for the individual is acquired (step 19-3). FIG. 20 shows an example of flow of evaluation value acquiring method with the evaluation value acquiring section 47. As shown in the figure, the evaluation value acquiring section 47 converts the gene type individual to an expression type (namely to four parameter values for the throttle characteristic) with a type conversion section 54, and actually applies the expression type individual to the electronic throttle control module 42. A user rides a vehicle to which the expression type individual is applied, physically feels the ride comfort (ride feeling) of the vehicle while operating the throttle device, and evaluates the ride comfort on the basis of 100 marks. The evaluation value may be handled with an input device mounted on the vehicle.

After the evaluation value is acquired, data of the individual and its evaluation value are stored in the data storage section 50 (step 19-4).

The above steps 19-3 and 19-4 are applied to every individual of the entire set. When it is judged that the evaluation values are acquired for all the individuals (step 19-5), the position and size of the next generation search area are changed according to the data stored in the data storage section 50 with the search area changing section 51 (step 19-6). For changing the position of the search area, the above method (a) or (b) may be used, and for changing the size of the search area, any of the above methods (c) to (d) may be used. When the above method (c-1) is used for example, pre-stored data as shown in FIGS. 21(a) and 21(b) may be used. FIG. 21(a) is an example of data used in determining the size of the next generation search area irrespective of the size of the current generation search area, and FIG. 21(b) is an example of data used in determining the size of the next generation search area on the basis of the size of the current generation search area.

Figure 22:
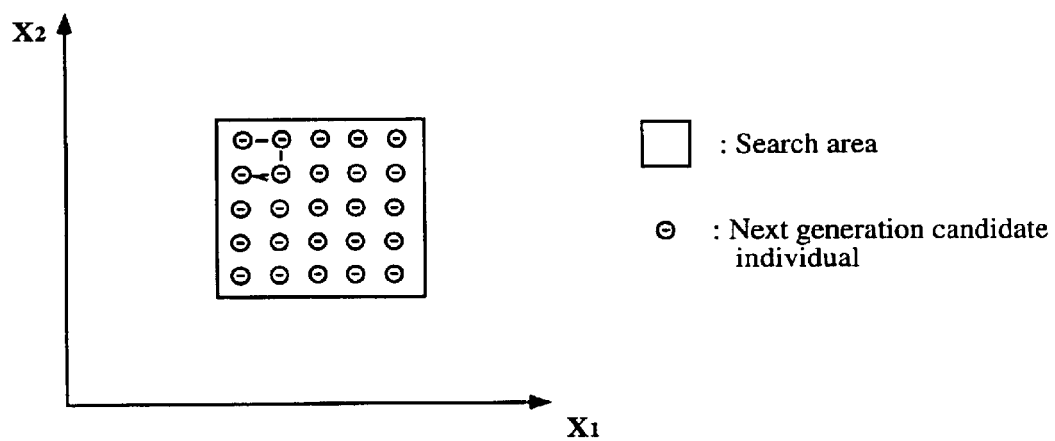
FIG. 22 shows an example of creating the next generation candidate individuals in all-inclusive manner within the search area.

When the position and size of the next generation search area are determined with the search area changing section 51, a set of candidate individuals to be the next generation candidate individuals are created within the range of the search area determined with the next generation individual creating section 48 (step 19-7). Here, while the next generation candidate individuals set may be created by gene calculation, since the search area is already determined, the set may also be created in all-inclusive manner at constant intervals within the search area as shown in FIG. 22.

Next, inter-individual distance information is calculated with the inter-individual distance calculating section 52. On the basis of the information, next generation individuals are chosen from the next generation candidate individuals set with the individuals set operating section 53 to create a set of next generation individuals (step 19-8).

The above method (g) or (h) may be used to calculate the inter-individual distance information.

The individuals set operating section 53 may also choose individuals by estimating the evaluation value for every candidate individual and using both of the estimated information and the inter-individual distance information.

Figure 23:
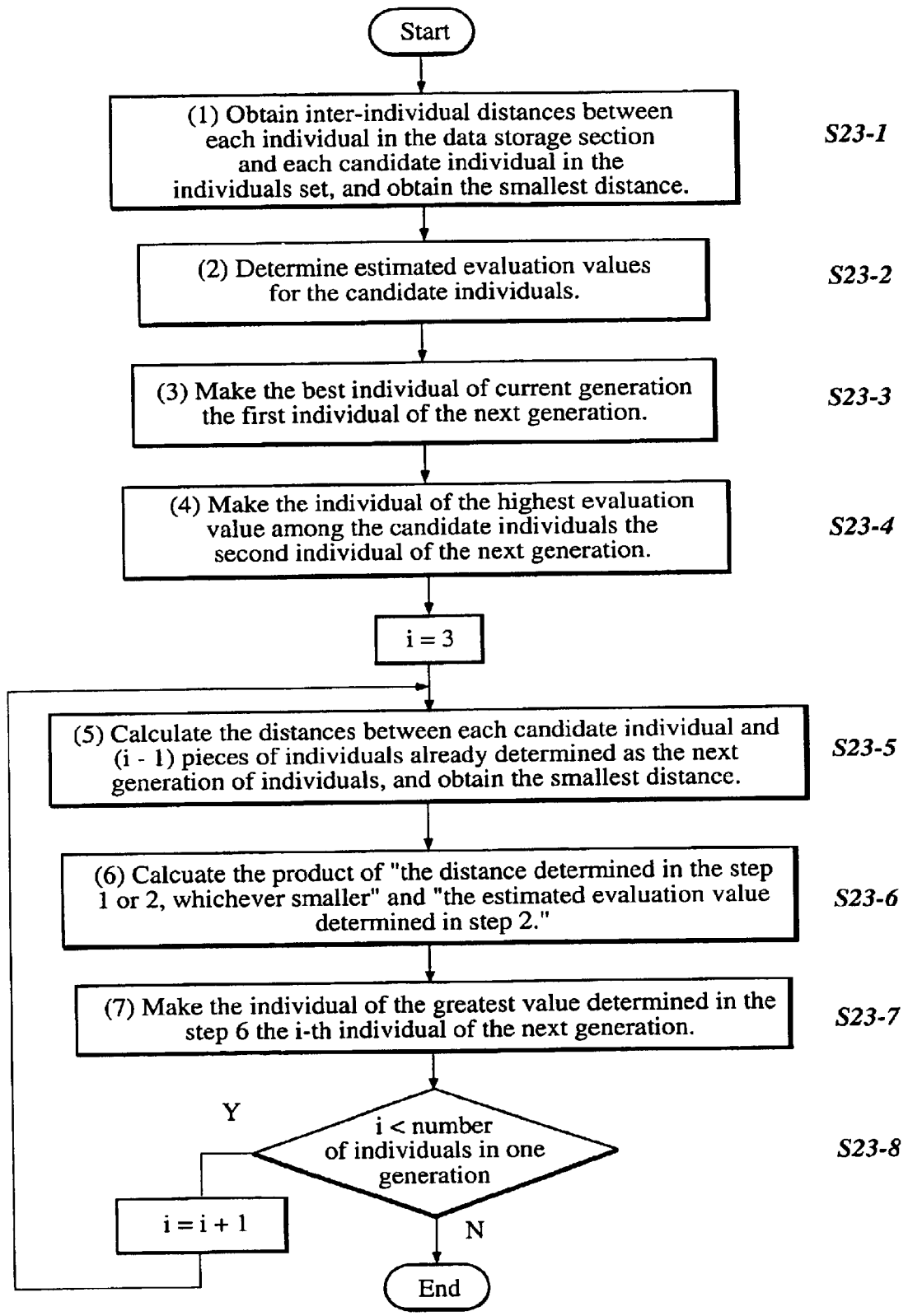
FIG. 23 is a flowchart of the next generation individual choosing process with the individuals operating section using the inter-individual distances and estimated evaluation values.

FIG. 23 is a flowchart of the next generation individuals choosing process with the individuals set operating section using inter-individual distances and the estimated evaluation values. FIG. 24 shows the concept of the choosing process. A specific example of the process with the individuals set operating section 53 is described below while referring to FIGS. 23 and 24.

First, as shown in FIG. 24(a), for every candidate individual in the set, inter-individual distance to every individual in the data storage section is calculated to determine a minimum value of the distance (step 23-1), and an evaluation value for every candidate individual is acquired (step 23-2). Further, a best individual of the current generation is chosen as the first one of the next generation (step 23-3); in the embodiment shown in FIG. 24(a), the chosen individual is indicated with a black circle.

As shown in FIG. 24(b), the individual having the highest estimated evaluation value is chosen as the second individual of the next generation (step 23-4). In the embodiment shown in FIG. 24(b), the chosen individual has an estimated evaluation value of 70 points.

Further, as shown in FIG. 24(c), for each candidate individual, the inter-individual distances to the individuals determined already as the next generation individuals (the individuals indicated with black circles in the embodiment shown in FIG. 24(c)) are calculated, and an individual having the minimum distance is determined (step 23-5).

For every candidate individual, a product is calculated by multiplying together whichever smaller of the distances calculated with the steps (23-1) and (23-5) and the estimated evaluation value given to the candidate individual (step 23-6), and the individual having a maximum value calculated here is chosen as an individual of the next generation (step 23-7).

Until individuals in number for the next generation are obtained (step 23-8), operation of the steps 23-5 to 23-7 are repeated.

As the operation of the above steps 19-3 to 19-8 is repeated, the user can finally reach a preferable throttle characteristic.

As the individuals group of the next generation is created as described above by changing the position and size of the search area, or by choosing the next generation individuals from the candidate individuals already created on the basis of the inter-individual distance information, it is possible to restrict random nature while retaining versatility of individuals, and an effect is provided that the evolution efficiency of individuals is improved.

The above embodiment is an example of applying the evolution efficiency improving method of this invention to the control of the vehicle throttle characteristic. However, the evolution efficiency improving method of this invention may be applied to any control object if parameters are optimized by evolutionary computing. For example, the method may be applied to a device for optimizing the assist power amount in bicycles equipped with an electric motor power assist device, or to a device for optimizing the actions of robots having control objects when the robot changes its components such as the head portion, leg portion, or arm portion.

[Effect of the Invention]

As described above, this invention relates to a method of improving efficiency of evolution in optimization method using evolutionary computing to obtain individuals of higher suitability by repeating the steps of; forming one generation with a group of individuals, and performing calculation using individuals of at least said generation to create a group of individuals of the next generation. Since the inter-individual distance between any individuals in a selection space is calculated and the position of the next generation individuals group in the selection space is restricted on the basis of the calculated inter-individual distance, an effect is brought about that the evolution efficiency is improved without losing versatility while restricting the random nature of individuals.

Additionally, in the present invention, correlations between various inputs and various outputs of the control modules can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J. -S. R. Jang, C. -T. Sun, E. Mizutani, "Neuro-Fuzzy and Soft Computing" Prentice Hall Upper Saddle River, N.J. 07458 (1997), C. -T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nunnela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

Of course, the foregoing description is that of preferred embodiments of the invention, and various changes and modifications may be made without departing from the spirit and scope of the invention, as defined by the appended claims.

What is claimed is:

1. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the coordinates and/or the size of the search area in the selection space are changed in accordance with the score(s) of the adapted chromosome(s).

2. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the selection of genes is conducted randomly in the search area.

3. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the selection of genes is conducted in the search area based on the coordinates of the genes of the adapted chromosome(s).

4. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the central coordinates of the search area of the subsequent generation is set at the coordinates of the genes of the adapted chromosome(s) in the selection space.

5. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the central coordinates of the search area of the subsequent generation is set in the selection space at coordinates calculated from weighted averages of the coordinates of the chromosomes of the current generation based on their scores.

6. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the size of the search area for a subsequent generation is changed in accordance with the scores of the chromosomes of the current generation.

7. The method according to claim 6, wherein the size of the search area for a subsequent generation is changed in accordance with the score(s) of the adapted chromosome(s).

8. The method according to claim 6, wherein the size of the search area for a subsequent generation is changed in accordance with the average score of the respective chromosomes of the current generation.

9. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the size of the search area for a subsequent generation is changed in accordance with a distance between the central coordinates of the search area for the current generation and the central coordinates of the search area for the subsequent generation.

10. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the size of the search area for a subsequent generation is changed in accordance with the central coordinates of the search area of the subsequent generation.

11. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while generating the machine until desired performance of the machine is demonstrated, wherein a group of candidate chromosomes of a subsequent generation is selected based on distances between any candidate chromosomes of the subsequent generation in the selection space.

12. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein a group of candidate chromosomes of a subsequent generation is selected based on distances between chromosomes generated currently and in the past in the selection space.

13. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the distances are defined using vectors connecting any two coordinates of genes.

14. The method according to claim 12, wherein the distances are defined using vectors connecting any two coordinates of genes.

15. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the indicative signals are sensory signals, and a user who operates the machine scores the chromosomes based on the sensory signals.

16. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation, of chromosomes within the search area, and operating the machine using the subsequent generation of chromosomes; and (e) repeating steps (b) through (d) while operating the machine until desired performance of the machine is demonstrated, wherein the indicative signals are electronic signals, and a device which receives the signals scores the chromosomes by comparing values of the signals with preselected target values.

17. A method for controlling performance of a machine controlled by at least one control module having an input-output relationship regulated by control parameters, said method comprising the steps of:

(a) configuring a first generation of chromosomes coding for the control parameters by preselecting genes constituting the first generation of chromosomes from a selection space used as a gene pool, and activating the machine using the first generation of chromosomes, said genes being defined by coordinates in the selection space;

(b) selecting and scoring adapted chromosome(s) by evaluating each chromosome based on signals indicative of performance of the machine;

(c) setting a search area in the selection space in accordance with the score(s) under predetermined rules;

(d) selecting genes for a subsequent generation of chromosomes within the search area, and operating the machine using the subsequent generation of chromosomes; and (e) repeating steps (b) through (d) while operating the machine until desired performance of the machine is demonstrated, wherein the machine is a motor.

18. The method according to claim 15, wherein the machine is a vehicle, and the sensory signals are related to the user's ride comfort.

19. The method according to claim 18, wherein the machine is an electronic throttle provided in the vehicle, which is controlled by the control module.

20. The method according to claim 19, wherein the input and output of the control module are accelerator operation amount and electronic throttle valve opening, respectively.

21. The method according to claim 19, wherein the control parameters include first-order time lag constant (DR) and acceleration compensation factor (AG).

22. The method according to claim 18, wherein the vehicle is a motorcycle.

* * * * *

UNITED STATES PATENT AND TRADEMARK OFFICE
CERTIFICATE OF CORRECTION

PATENT NO. : 6,886,003 B2
APPLICATION NO. : 09/873510
DATED : April 26, 2005
INVENTOR(S) : Tomoaki Kishi It is certified that error appears in the above-identified patent and that said Letters Patent is hereby corrected as shown below:

At column 1, line 19, after "assuming" please delete "a".

At column 1, line 20, after "system" please insert - -, - -.

At column 1, line 26, please delete "difficulty" and insert - - difficult - -, therefor.

At column 1, line 52, please delete "pat." and insert - - Pat. - -, therefor.

At column 4, line 30, after "invention" please insert - -. - -.

At column 5, line 24, after "section" please insert - -. - -.

At column 13, line 40 (Approx.), after "30", please insert - -, - -.

At column 13, line 66, after "(25, 30" please insert - -, - -.

At column 16, line 62, please delete "taime" and insert - - time - -, therefor.

At column 19, line 30, please delete "-S." and insert - - S. - -, therefor.

At column 19, line 30, please delete "-T." and insert - - T. - - , therefor.

At column 19, line 32, please delete "-T." and insert - - T. - -, therefor.

At column 19, line 50, please delete "Nunnela," and insert - - "Nurmela, - - , therefor.

At column 23, line 40 (Approx.), in Claim 11, please delete "generating" and insert - - operating - -, therefor.

Signed and Sealed this

Fifteenth Day of August, 2006

JON W. DUDAS
*Director of the United States Patent and Trademark Office*